US012278414B1

(12) United States Patent
Alam et al.

(10) Patent No.: US 12,278,414 B1
(45) Date of Patent: *Apr. 15, 2025

(54) MILLIMETER WAVE CONNECTION DEVICE FOR RECTANGULAR/SUBSTRATE INTEGRATED WAVEGUIDES

(71) Applicant: IMAM MOHAMMAD IBN SAUD ISLAMIC UNIVERSITY, Riyadh (SA)

(72) Inventors: Muhammad Shah Alam, Riyadh (SA); Asif Alam, Riyadh (SA); Khalid Almuhanna, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/925,651

(22) Filed: Oct. 24, 2024

Related U.S. Application Data

(63) Continuation of application No. 18/640,684, filed on Apr. 19, 2024, now Pat. No. 12,166,262.

(51) Int. Cl.
*H01P 5/08* (2006.01)
*H01P 1/208* (2006.01)

(52) U.S. Cl.
CPC ............ *H01P 5/082* (2013.01); *H01P 1/2088* (2013.01)

(58) Field of Classification Search
CPC .. H01P 5/024; H01P 5/08; H01P 5/082; H01P 5/087; H01P 3/12; H01P 3/121
See application file for complete search history.

(56) References Cited

U.S. PATENT DOCUMENTS

| | | | |
|---|---|---|---|
| 9,099,787 B2 | 8/2015 | Blech | |
| 9,520,942 B2 | 12/2016 | Cao et al. | |
| 10,218,076 B1 | 2/2019 | Bhardwaj et al. | |

FOREIGN PATENT DOCUMENTS

| | | |
|---|---|---|
| CN | 201383535 Y | 1/2010 |
| CN | 104064875 B | 4/2016 |

(Continued)

OTHER PUBLICATIONS

Gatti et al. ; Broadband Right-Angle Rectangular Waveguide to Substrate Integrated Waveguide Transition with Distributed Impedance Matching Network ; MDPI applied sciences 9 ; Jan. 23, 2019 ; 16 Pages.

(Continued)

*Primary Examiner* — Andrea Lindgren Baltzell
*Assistant Examiner* — Kimberly E Glenn
(74) *Attorney, Agent, or Firm* — Oblon, McClelland, Maier & Neustadt, L.L.P.

(57) ABSTRACT

A device and method for transitioning between a rectangular waveguide (RWG) and a substrate integrated waveguide (SIW) or air-filled SIW (AFSIW) in millimeter wave communication systems. The transition apparatus includes a pair of hollow metallic structures, each featuring a tapered body connecting RWG and SIW (or AFSIW) interfaces. The tapered bodies facilitate a seamless transition with lengths ranging from approximately 1 mm to 15 mm, accommodating SIW and AFSIW substrate heights from about 0.2 mm to 1.0 mm. The apparatus ensures impedance matching within a specified range, maintains a voltage standing wave ratio between 1 and 5, and achieves a total reflection coefficient between −20 dB and −10 dB. Additionally, the apparatus exhibits high modal purity, with dominant mode levels between −1 dB and 0.25 dB, and significantly attenuated non-dominant modes. The apparatus supports efficient sig- (Continued)

nal transmission within the frequency range of approximately 50 GHz to 75 GHz.

13 Claims, 23 Drawing Sheets

(56) References Cited

FOREIGN PATENT DOCUMENTS

| | | | |
|---|---|---|---|
| CN | 116093569 | A | 5/2023 |
| GB | 2489950 | A | 10/2012 |
| JP | 11074702 | A | 3/1999 |
| WO | 2021123111 | A1 | 6/2021 |

OTHER PUBLICATIONS

Alam et al. ; A Wideband Transition Design Technique From RWG to SIW Technologies ; IEEEAccess, vol. 11 ; Oct. 11, 2023 ; 14 Pages.

Alam et al. ; A Wide-band Millimeter Wave RWG to Air-Filled SIW Transition ; 2023 IEEE/MTT-S International Microwave Symposium ; 4 Pages.

H. Lee, M. Uhm and I. Yorn, "K-band substrate integrated waveguide to rectangular waveguide transition," 2015 Conference on Microwave Techniques (COMITE), Pardubice, Czech Republic, 2015, pp. 1-4.

MILLIMETER WAVE CONNECTION DEVICE FOR RECTANGULAR/SUBSTRATE INTEGRATED WAVEGUIDES

CROSS-REFERENCE TO RELATED APPLICATIONS

The present application is a Continuation of U.S. application Ser. No. 18/640,684, now allowed, having a filing date of Apr. 19, 2024.

STATEMENT REGARDING PRIOR DISCLOSURE BY THE INVENTORS

Aspects of this technology are described in an article "A Wide-band Millimeter Wave RWG to Air-Filled SIW Transition" published in 2023 IEEE/MTT-S International Microwave Symposium-IMS 2023 on Jun. 11, 2023, which is incorporated herein by reference in its entirety. Aspects of this technology are described in an article "A Wideband Transition Design Technique From RWG to SIW Technologies" published in 2023 IEEE Access, Vol. 11, pp. 109539-109552, on Oct. 2, 2023, which is incorporated herein by reference in its entirety.

STATEMENT OF ACKNOWLEDGEMENT

Financial support provided by the Deanship of Scientific Research, Imam Mohammad Ibn Saud Islamic University, Riyadh, Saudi Arabia, through Grant Ref: IMSIU-RG23034 is gratefully acknowledged.

BACKGROUND

Technical Field

The present disclosure is directed to an apparatus, method and system for wide-band transitioning between Rectangular Waveguide (RWG) to Substrate Integrated Waveguide (SIW) technologies or air-filled SIW (AFSIW) technologies used in millimeter-wave (mmWave) frequency applications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

With evolving technology, there is a user demand for rapid development of communication systems. Currently, actively developed systems using communication in millimeter-wave (mmWave) bands include data transmission systems operating in 28 gigahertz (GHz) and 60 GHz bands, long-distance wireless power transmission (LWPT) systems operating in fifth-generation (5G), wireless gigabit (WiGig), and industrial, scientific, and medical (ISM) 24 GHz bands, and automotive radar systems operating in 24 GHz and 79 GHz bands. MmWave and microwave frequencies are increasingly utilized across a broad spectrum of applications, including high-speed wireless sensors, radar systems, security screening, through-wall sensing and imaging, non-destructive testing and evaluation, production quality monitoring, and environmental imaging from mobile platforms such as vehicles, robots, aircraft, or spacecraft. Additionally, mm Wave technologies are used in technologies for inspecting packaged goods and determining the occupancy of regions near moving platforms.

The utilization of mmWave frequencies has been increasing in radar systems and wireless sensors, prompting the development of sophisticated technologies. The mmWave frequencies can be projected using waveguide devices. A waveguide is a structure that guides waves by restricting the transmission of energy in one direction. Without the physical constraint of a waveguide, waves would expand into three-dimensional space, and their intensities would decrease according to the inverse square law. There are different types of waveguides for different types of waves. The original and most common type of waveguide is a hollow conductive metal pipe used to carry high-frequency radio waves, particularly microwaves. Dielectric waveguides are used at higher radio frequencies.

Among the various waveguide technologies, a conventional rectangular waveguide (RWG) has been used in the design of high-performance systems, as RWGs exhibit high power handling capabilities. However, RWGs face challenges related to complex structures, high implementation costs, and the need for specialized components for transitions, hindering their integration into high-frequency microwave components and systems.

Substrate Integrated Waveguide (SIW) technology has emerged as a significant alternative, effectively bridging the gap between conventional waveguide benefits and the necessity for lower cost and easy integration. SIW technology has been extensively used for over two decades in the development of microwave systems across a wide frequency range, from gigahertz to terahertz.

There are two known types of SIW technologies employed in mmWave applications. The first type is the conventional SIW, which incorporates dielectric-filled technology and is widely used for its versatility. The second type, the air-filled SIW (AFSIW), is an SIW with portions of the dielectric material removed, resulting in lower insertion loss and higher power handling capabilities.

In evolving communication systems utilizing SIW technologies, it is often required to interface the device with an external system that relies on the RWG technology to provide signal feed to the SIW and AFSIW wireless systems. Conseqently, a generalized wideband low-loss RWG to either an SIW or an AFSIW transition is required. Existing technoligies for designing transitions from RWG to SIW are constrained by their reliance on complex optimization techniques tailored specifically for RWG to SIW configurations. This specificity renders the techniques difficult to apply to other waveguide designs. Additionally, the existing methods do not consider mode differences at the transition, which can result in issues concerning the purity of transmission modes. The lack of a structured design process further elongates the development timeline, and the employment of intricate structures presents additional challenges to performance. In comparison, the development of transitions from RWG to air-filled Substrate Integrated Waveguide (AFSIW) has been minimally addressed in the existing technology.

Thus, conventional techniques suffer from one or more drawbacks, including an absence of interconnections of RWG and SIW or AFSIW, hindering their adoption. There is need for a design technique that caters to both RWG to SIW and RWG to AFSIW transitions within the existing technologies. Therefore, there is a requirement for waveguide technology integration. The present disclosure seeks to rectify these issues by providing a unified transition apparatus and methodology for SIW technologies. The present disclosure includes a simplified design approach, founded on a systematic design process and underpinned by theoretical principles, to deliver superior performance across the mmWave frequency spectrum. The present disclosure further provides a detailed mode analysis to ensure the efficacy of the transition design.

Accordingly, it is one object of the present disclosure to provide an apparatus, method and system for a transition from RWG to both SIW and air-filled AFSIW. Another object is to provide a systematic design process that reduces the reliance on complex and specific optimization procedures previously necessitated by RWG to SIW and RWG to AFSIW transitions.

SUMMARY

In an exemplary embodiment, a millimeter wave transition apparatus for interconnecting a rectangular waveguide (RWG) and one of a substrate integrated waveguide (SIW) and an air-filled substrate integrated waveguide (AFSIW) is described. The millimeter wave transition apparatus includes a first rectangular waveguide (RWG) and a second RWG, one of the SIW and the AFSIW, a first hollow metallic structure having a rectangular first end configured to connect to an exit aperture of the first RWG and a rectangular second end configured to connect with an entrance aperture of the SIW, wherein the first hollow metallic structure comprises a tapered body which extends from the rectangular first end to the rectangular second end, and a second hollow metallic structure having a rectangular first end configured to connect with an entrance aperture of the second RWG and a rectangular second end configured to connect to an exit aperture of one of the SIW and the AFSIW, wherein the second hollow metallic structure comprises a tapered body which extends from the rectangular first end to the rectangular second end, wherein the tapered body of each hollow metallic structure has a transition length between its rectangular first end and its rectangular second end of about 1 mm to about 15 mm for an SIW height or AFSIW aperture height in the range of about 0.2 mm to about 1.0 mm, has an impedance in a range of about 350 ohms to about 400 ohms at its rectangular first end, at which an impedance of the hollow metallic structure matches an impedance of the SIW or AFSIW aperture, has a voltage standing wave ratio in the range of about 1 to about 5 for transition lengths of about 3 mm to about 20 mm and for SIW substrate heights or AFSIW substrate heights of about 0.127 mm to about 0.787 mm, has a total reflection coefficient in the range of about −20 dB to about −10 dB and has modal purity in a range of about −1 dB to about 0.25 dB in a dominant mode and about −125 dB to about −75 dB in a non-dominant mode during a transmission of a millimeter wave having a frequency λ in the range of about 50 GHz to about 75 GHz through the transition apparatus.

In another exemplary embodiment, a method for making a low-loss millimeter wave transition structure for interconnecting a rectangular waveguide (RWG) and one of a substrate integrated waveguide (SIW) and an air-filled substrate integrated waveguide (AFSIW) is described. The method includes obtaining a characteristic impedance $Z_0$ of the RWG and a characteristic impedance $Z_2$ of the SIW or AFSIW, obtaining a width $a_0$ and a height $b_0$ of the RWG, obtaining a width $a_1$ and a height $b_1$ of the SIW or AFSIW, obtaining a resonant frequency $\lambda_0$ of the RWG and an effective dielectric constant $\varepsilon_{eff}$ of the SIW or AFSIW, calculating, by a computing device including a memory storing program instruction and at least one processor configured to execute the program instructions, a shortest length $L_{SIW}$ of the transition structure which matches the impedance of the SIW aperture or the AFSIW aperture, wherein the shortest length is in the range of about 1 mm to about 15 mm for an SIW aperture height or AFSIW aperture height in the range of about 0.2 mm to about 1.0 mm, has a voltage standing wave ratio in the range of about 1 to about 5 for transition lengths of about 3 mm to about 20 mm and for SIW substrate heights of about 0.127 mm to about 0.787 mm, has a total reflection coefficient $\Gamma_T$ in the range of about −20 dB to about −10 dB and has modal purity in a range of about −1 dB to about 0.25 dB in a dominant mode and about −125 dB to about −75 dB in a non-dominant mode during a transmission of a millimeter wave having a frequency λ in the range of about 50 GHz to about 75 GHz through the transition apparatus, and fabricating, by CNC micromachining, the transition structure.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
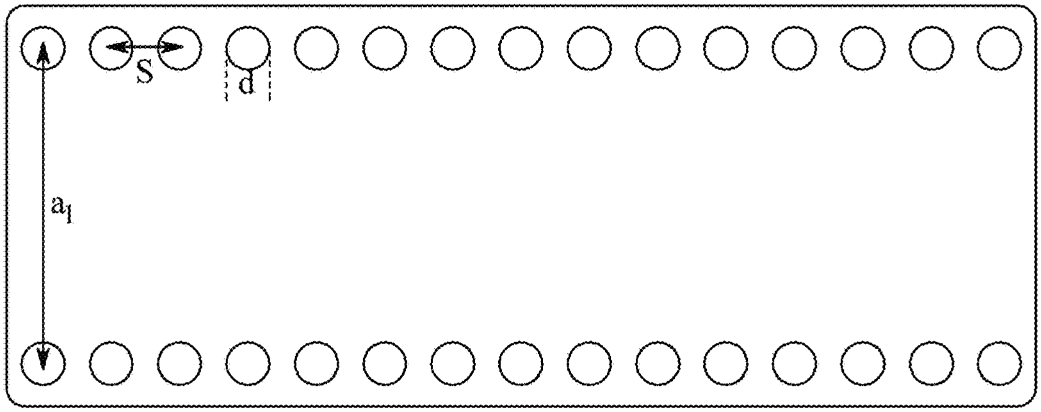
FIG. 1A illustrates a geometrical structure of the substrate integrated waveguide (SIW), according to certain embodiments.

In the drawings, like reference numerals designate identical or corresponding parts throughout the several views. Further, as used herein, the words “a”, “an” and the like generally carry a meaning of “one or more”, unless stated otherwise.

Furthermore, the terms “approximately,” “approximate”, “about” and similar terms generally refer to ranges that include the identified value within a margin of 20%, 10%, or preferably 5%, and any values therebetween.

Aspects of this disclosure are directed to a millimeter wave transition apparatus and methods for making and using a low-loss millimeter wave transition structure to facilitate the manufacture of efficient wide-band transitions for integrating Rectangular Waveguides (RWG) with Substrate Integrated Waveguide (SIW) or Air-Filled Substrate Integrated Waveguide (AFSIW) systems in millimeter-wave communications. The millimeter wave transition apparatus and systematic design process overcome the neglected mode purity, performance deficiencies, reliance on complex optimizations, and overly intricate structures of existing conventional transitions. The transition apparatus of the present disclosure presents a wideband transition from RWG to SIW or AFSIW without necessitating separate design processes, thereby reducing complexity and cost while enhancing performance.

The waveguides, either SIW or AFSIW, used in the present disclosure are designed to receive a signal input having a transverse electric (TE) mode and a transverse magnetic TM mode. The waveguide, by virtue of its geometry, propagates only in the TE mode. The waveguide has a cut-off frequency of the TE mode which is a design feature of the waveguide, relying on its internal dimensions, via widths and distance between the vias. A waveguide is selected based on performance factors and the selection of the type of waveguide is not a subject of the present disclosure.

Aspects of the present disclosure relate to the derivation of an analytical expression for determining the best transition length in both SIW and AFSIW applications, significantly aiding the design process and improving transition efficacy. Comprehensive validation is executed through four design examples assessing mode purity, reflection coefficient, and insertion loss. The transition apparatus of the present disclosure achieves an insertion loss as low as 0.35 dB and a relative bandwidth of 40%, which is a significant advancement over existing solutions.

FIG. 1A-FIG. 1L describe structures of a substrate-integrated waveguide (SIW) (FIG. 1A, 1C-1G, an air-filled substrate-integrated waveguide (AFSIW) (FIG. 1B, 1H-1L), with a millimeter wave transition apparatus, for various configurations of the transition apparatus. FIG. 1A illustrates a geometrical structure of the SIW. The SIW utilizes a double-layer printed circuit board (PCB). An extension of the PCB may act as a dielectric bridge which is inserted into a transition. The substrate incorporates two aligned rows of metallic vias that delineate the wave propagation region. The arrangement of these vias alongside the pertinent geometric parameters is depicted. The width of SIW is gauged by the center-to-center distance between the rows of vias, denoted as "$a_1$". The interval between adjacent vias within the same row is represented by "S", and the vias themselves possess a diameter indicated as "d". These dimensions are designed using a recognized calculation method for optimized transmission of waves through the waveguide.

Figure 1B:
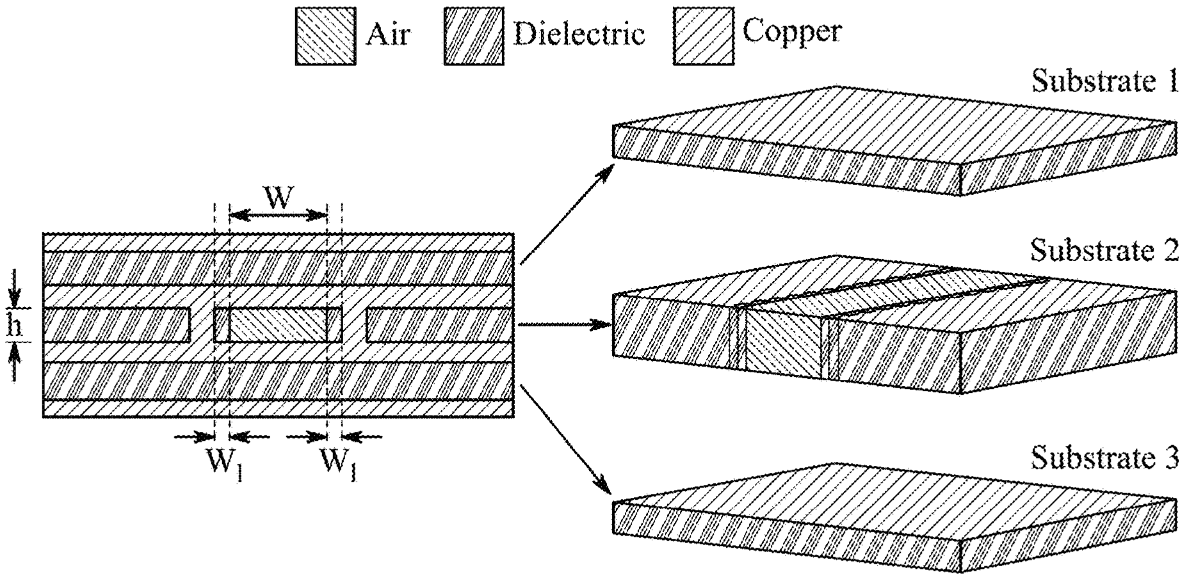
FIG. 1B illustrates a geometrical structure of millimeter-wave (mmWave) air-filled substrate integrated waveguide (AFSIW), according to certain embodiments.

FIG. 1B illustrates a geometrical structure of an AFSIW. FIG. 1B depicts a cross-sectional and an exploded view of the air-filled substrate-integrated waveguide (AFSIW) utilizing a multilayer printed circuit board (PCB) process. In this configuration, Substrate 1 and Substrate 3 form the conductive top and bottom surfaces, respectively. Between them, Substrate 2 is positioned centrally and comprises an air-filled region denoted by W. This central air-filled region is flanked by a dielectric slab with width $W_1$. Arrays of metallic vias, which extend through the height h of Substrate 2, are situated on both sides of this substrate.

The cutoff frequency fc of the waveguide for waves propagating within the AFSIW is governed by equation (1), which establishes the relationship between the width W of the air-filled region and cutoff frequency of the waves. The relationship is a principle for determining the appropriate dimensions of the waveguide.

$$\tan\left(\frac{W_1\pi\sqrt{\epsilon_r}}{\sqrt{\epsilon_r}}\right) = \cot\left(\frac{W\pi f_c}{c}\right), \tag{1}$$

where W and $W_1$ are the widths of air-filled and dielectric-filled regions of AFSIW, respectively, c is the speed of light, and $\in_r$ is the dielectric constant.

The dimensions of the metallic vias, including their diameters and the center-to-center separations are determined for optimal wave transmission. Substrate 1 and substrate 3 are additionally noted for their potential utility in realizing baseband or digital circuits, thereby contributing to a more cost-effective wireless system solution.

Figure 1C:
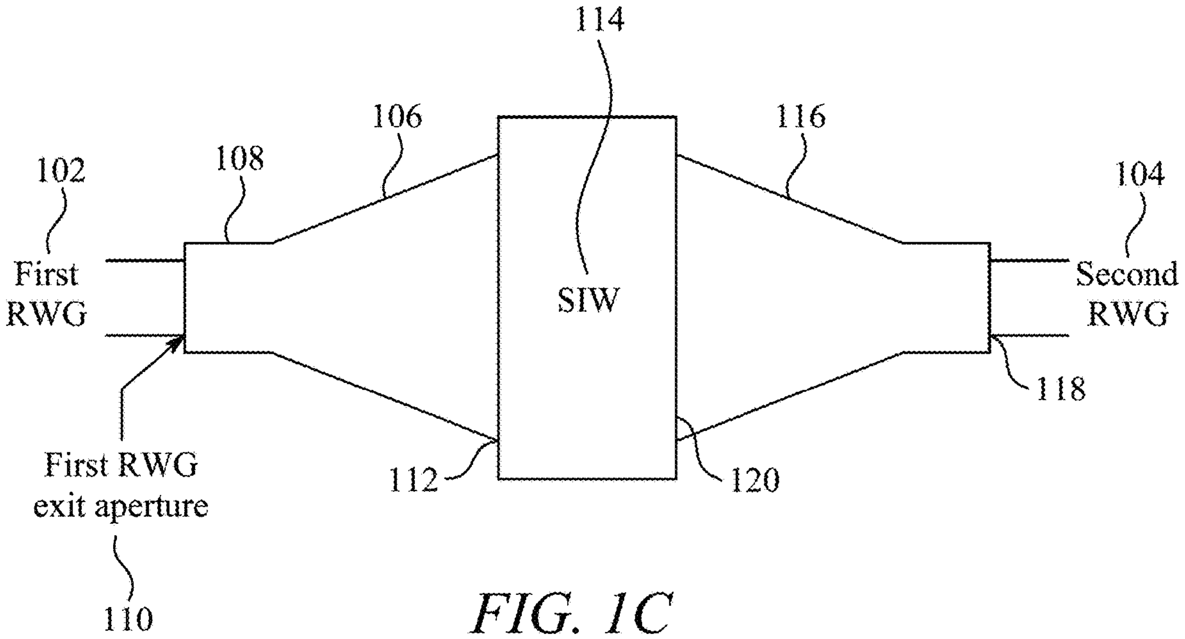
FIG. 1C illustrates a schematic of a millimeter wave transition apparatus for an SIW, according to certain embodiments.

FIG. 1C illustrates a schematic of the millimeter wave transition apparatus of the present disclosure. The linearly tapered transition has been facilitated by the millimeter wave transition apparatus, referred to as a transition hereinafter.

In FIG. 1C, an SIW 114 is connected between a first RWG 102 and a second RWG 104. A first transition is needed to mate the first RWG 102 to an input aperture of the SIW 114. Further, a second transition is needed to mate an exit aperture of the SIW 114 to the second RWG 104.

The first transition (on the left side of FIG. 1C) includes a first hollow metallic structure 106 having a rectangular first end 108 configured to connect to a rectangular exit aperture 110 of the first RWG 102. The first hollow metallic structure 106 has a rectangular second end 112 configured to connect with a rectangular entrance aperture of the SIW 114. The first hollow metallic structure 106 includes a tapered body which extends from the rectangular first end 108 to the rectangular second end 112. The first transition may taper along its width, along its height or both depending on the relative dimensions of the width and height of the rectangular exit aperture of the first RWG 108 and the width and height of the entrance aperture of the SIW 114. Additionally, the length of the first transition may vary depending on the relative heights and relative widths of the first RWG 108 and the SIW 114, the wavelengths propagated through the first RWG 108, the first transition and the SIW, and on the inner construction and dimensional parameters of the SIW (or AFSIW). In order to improve impedance matching between the RWG 106 and the rectangular entrance aperture of the SIW 114, a portion of the dielectric circuit board of the SIW 114 is extended into the rectangular exit aperture of the transition.

The second transition (on the right side of the SIW 114 of FIG. 1C) includes a second hollow metallic structure 116 having a rectangular first end 118 configured to connect with an entrance aperture of the second RWG 104 and a rectangular second end 120 configured to connect to an exit aperture of the SIW 114. The second hollow metallic structure 116 comprises a tapered body which extends from the rectangular first end 118 to the rectangular second end 120. In order to improve impedance matching between the entrance aperture of the RWG 104 and the rectangular exit aperture of the SIW 114, a portion of the dielectric circuit board of the SIW 114 is extended into the rectangular exit aperture of the transition.

The tapered body of each hollow metallic structure (106, 116) has a transition length between its rectangular first end and its rectangular second end of about 1 mm to about 15 mm for an SIW aperture height in the range of about 0.2 mm to about 1.0 mm. The transition length and the SIW aperture height are shown in detail in FIG. 1D. The tapered body of each hollow metallic structure (106, 116) has an impedance in a range of about 350 ohms to about 400 ohms at its rectangular first end, at which an impedance of each of the hollow metallic structures (106, 116) matches an impedance of the SIW aperture due to the extension of the dielectric circuit board into the aperture of the tapered body of each hollow metallic structure (106, 116) and has a voltage standing wave ratio in the range of about 1 to about 5 for transition lengths of about 3 mm to about 20 mm and for SIW substrate heights of about 0.127 mm to about 0.787 mm. The tapered body of each hollow metallic structure (106, 116) has a total reflection coefficient in the range of about −20 dB to about −10 dB and has modal purity in a range of about −1 dB to about 0.25 dB in a dominant mode and about −125 dB to about −75 dB in a non-dominant mode during a transmission of a millimeter wave having a frequency λ in the range of about 50 GHz to about 75 GHz through the transition apparatus.

In an aspect of the present disclosure, the SIW is an AFSIW. When an AFSIW is selected, the extension of the dielectric circuit board into the transition aperture is not used, as there is no measurable benefit in impedance matching.

In an example, the hollow metallic structure is made of a metallic material. In one example, the metal is aluminum. In another example, the apparatus is fabricated by a high-precision CNC milling machine from metals or metal alloys.

FIG. 1D-FIG. 1G illustrate multiple configurations of a linearly tapered transition mechanism for interconnecting RWG and SIW technologies.

Figure 1D:
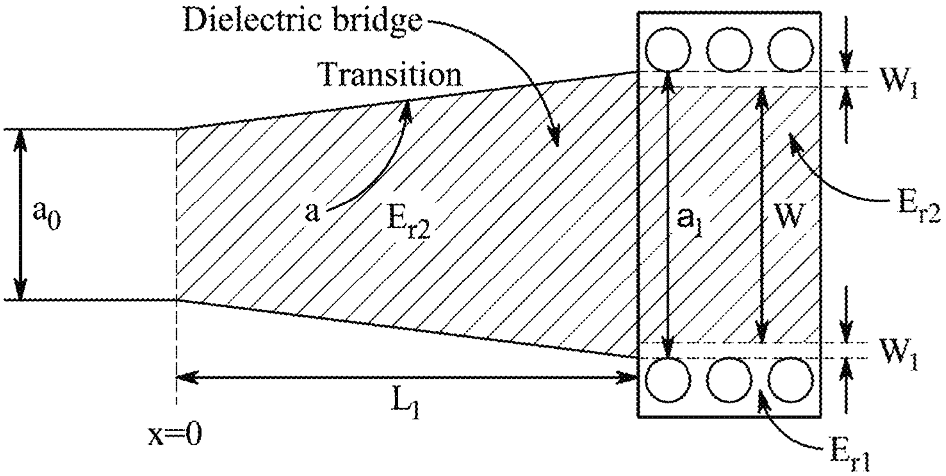
FIG. 1D illustrates a top view of a transition between rectangular waveguides (RWG) and SIW having a tapered out configuration where a1>a0, according to certain embodiments.

FIG. 1D illustrates a first configuration of tapered transition between RWG and SIW, showing a top view of a tapered-out configuration when $a_1>a_0$, in accordance with certain embodiments. The first configuration presents a transition with an expanding width. The rectangular first end 108 of the first hollow metallic structure 106 has a width $a_0$ and a height $b_0$. The rectangular second end 112 of the first hollow metallic structure 106 has a width $a_1$ and a height $b_1$. The tapered body of the first hollow metallic structure 106 is designed to taper out when either $a_0<a_1$ or $b_0<b_1$.

The tapering is shown as a gradual outward flare within the transition area, which is filled with a material of dielectric constant $\varepsilon_{r2}$. The dielectric constant, $\varepsilon_r$, is a measure of how much a certain dielectric material can store electrical energy in an electric field compared to a vacuum. It is a dimensionless number that represents the ratio of the permittivity of a substance to the permittivity of free space. For SIW or AFSIW, the dielectric constant affects the propagation of electromagnetic waves through the waveguide. It influences various properties of the waveguide, such as the phase velocity, wavelength, and characteristic impedance. Further, the length of this transition area, $L_1$, dictates the impedance profile along the path, essential for maintaining signal integrity.

Similar to the first hollow metallic structure 106, the rectangular first end 118 of the second hollow metallic structure 116 has a width $a_0$ and a height $b_0$. The rectangular second end 120 of the second hollow metallic structure 116 has a width $a_1$ and a height $b_1$. The tapered body of the second hollow metallic structure 116 is designed to taper out from the SIW towards the RWG when either $a_0>a_1$ or $b_0>b_1$.

Figure 1E:
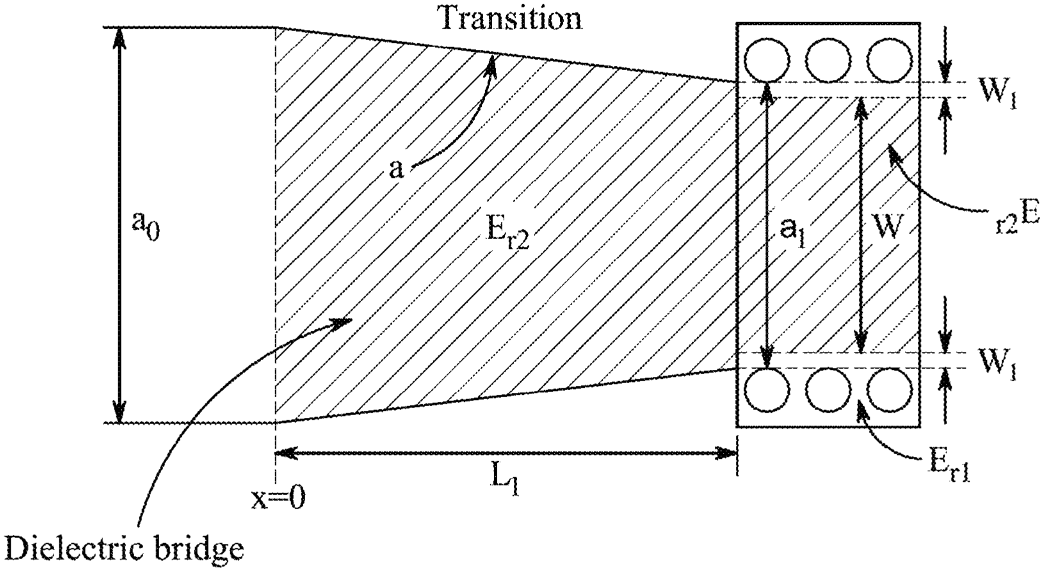
FIG. 1E illustrates a top view of a transition between RWG and SIW having a tapered in configuration when a0>a1 and incorporating a dielectric bridge, according to certain embodiments.

FIG. 1E illustrates a second configuration of tapered transition between the RWG and the SIW, showing a side view of a tapered in configuration when $a_0>a_1$, in accordance with certain embodiments. The tapered body of the first hollow metallic structure is tapered in when either $a_0>a_1$ or $b_0>b_1$. The SIW aperture includes a printed circuit board which extends into the rectangular second end 112 of the first hollow metallic structure 106. The transition extends over a defined length, 'L', adapting the wider dimensions of the RWG to the smaller SIW, ensuring a controlled impedance transition.

Figure 1F:
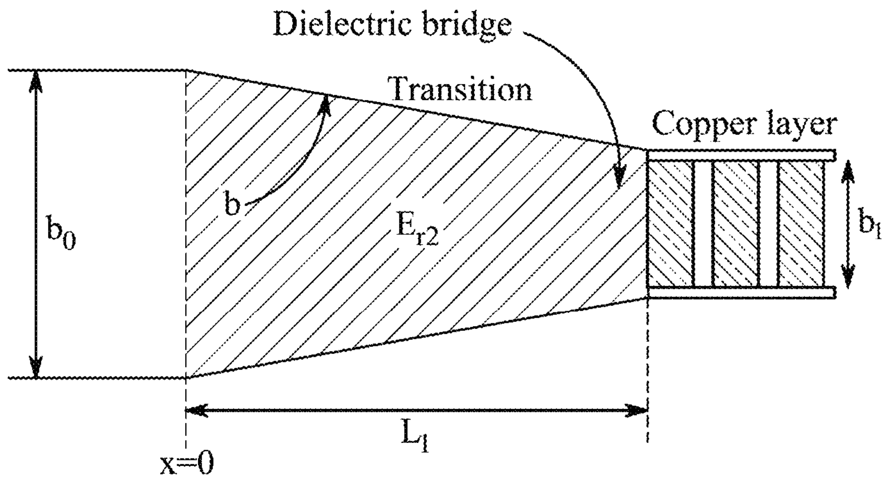
FIG. 1F illustrates a side view of a transition between RWG and SIW having a tapered in configuration when b0>b1, according to certain embodiments.

FIG. 1F illustrates a third configuration of a tapered transition between the RWG and the SIW showing a side view of a tapered in configuration when $b_1<b_0$, which incorporates the dielectric bridge. The tapered body of the first hollow metallic structure is designed to taper in when either $a_0>a_1$ or $b_0>b_1$. This configuration presents a side view where the vertical dimension of the SIW, '$b_1$', is smaller than that of the RWG, '$b_0$'. The transition linearly tapers inward from the RWG, decreasing in height to align with the reduced vertical aperture of the SIW, again over the transition length '$L_1$'.

Figure 1G:
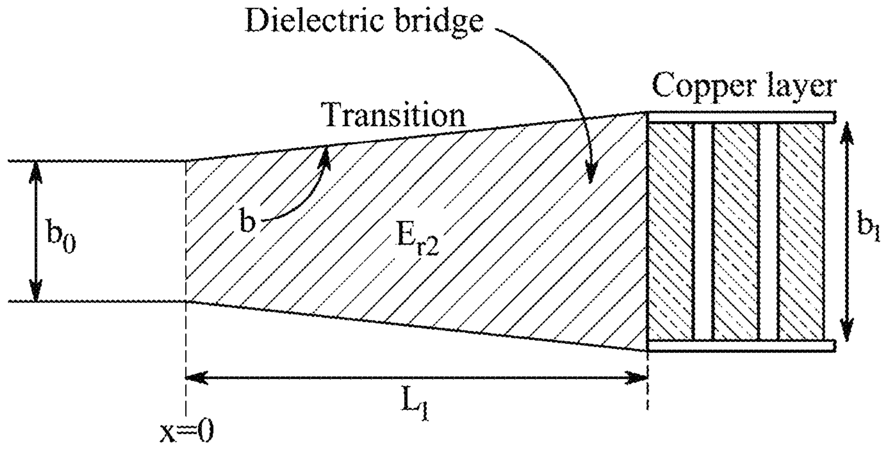
FIG. 1G illustrates a side view of a transition between RWG and SIW having a tapered out configuration when b0<b1, according to certain embodiments.

FIG. 1G illustrates a fourth configuration of a tapered transition between the RWG and the SIW showing a side view of a tapered out configuration when $b_0<b_1$, and incorporating the dielectric bridge. The tapered body of the second hollow metallic structure is designed to taper in when either $a_0<a_1$ or $b_0<b_1$. In contrast to the configuration, the vertical dimension of RWG, '$b_0$', is smaller, and the transition flares outwards to meet the larger SIW dimension, '$b_1$'. The gradual expansion in height across the transition length '$L_1$' modifies the smaller vertical aperture of the RWG to fit the larger one of the SIW.

In each configuration, boundaries of the SIW are defined by rows of metallic vias. The vias are arranged in parallel rows and serve as the walls of the SIW, containing the electromagnetic wave within the designated propagation area. The vias are of a uniform height, 'h', aligning with the height of the substrate layers. The presence of these vias alongside the transition ensures that the SIW retains its waveguide-like properties despite being integrated into a planar substrate form. The metallic vias are made of copper, as shown in FIG. 1G.

The transitions serve as a bridge between the conventional RWG, known for its capability to handle high-power signals but with the disadvantage of bulkiness, and the more compact SIW technology, which is preferable for its integration capabilities and cost-effectiveness.

The AFSIW transition configurations are shown in FIG. 1H-1L. The AFSIW configuration mentioned takes these advantages further by removing the dielectric material and employing an air-filled region 'W', bounded by the dielectric slabs of width '$W_1$' and the arrays of metallic vias, to enhance the waveguide performance by reducing insertion loss and increasing power handling. In the AFSIW, the dielectric substrate is not extended into the transitions, as there is no benefit in impedance matching.

Figure 1H:
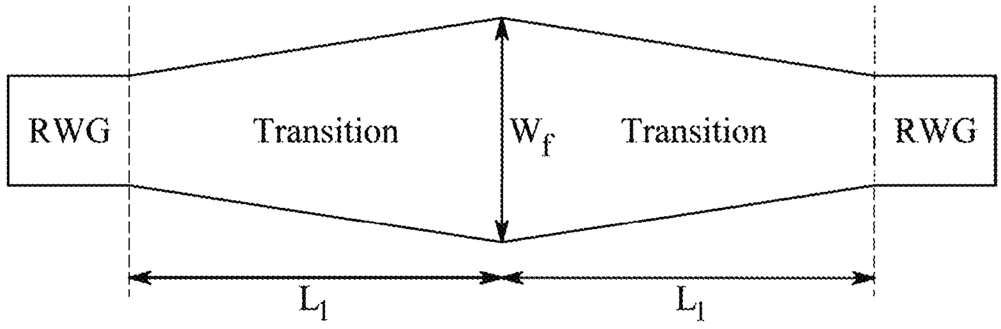
FIG. 1H illustrates a transition to transition simulation diagram for simulating the S11 scattering parameters of the transition structure, according to certain embodiments.

FIG. 1H illustrates a transition to transition simulation diagram for simulating the S11 scattering parameters of the transition structure.

Figure 1I:
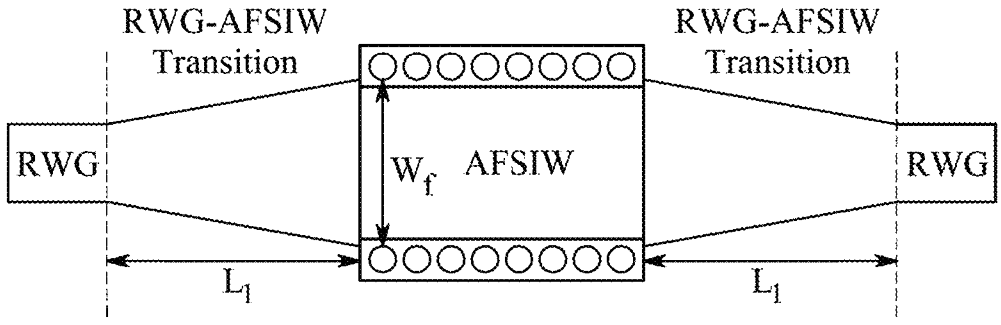
FIG. 1I illustrates a simulation diagram for simulating the S21 scattering parameters of the transition to AFSIW to transition, according to certain embodiments.

FIG. 1I illustrates a simulation diagram for simulating the S21 scattering parameters of the transition to AFSIW to transition.

Figure 1J:
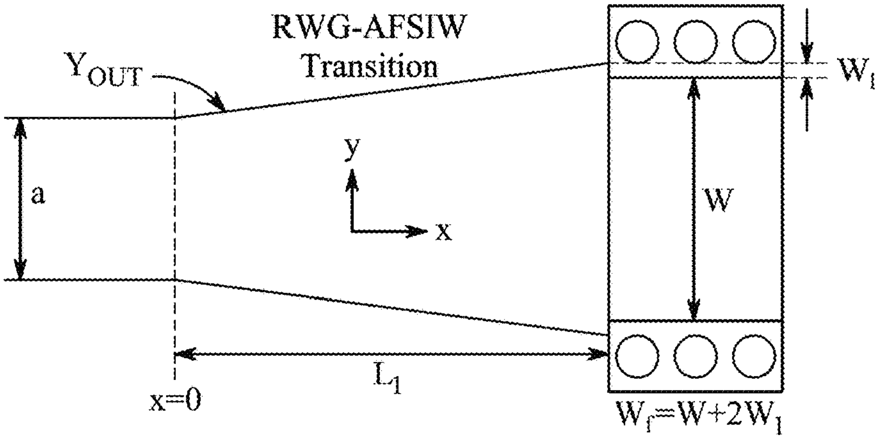
FIG. 1J illustrates the linearly tapered transition between RWG and AFSIW for tapering out in the width dimension, according to certain embodiments.

FIG. 1J illustrates the linearly tapered transition between RWG and AFSIW for tapering out in the width dimension.

Figure 1K:
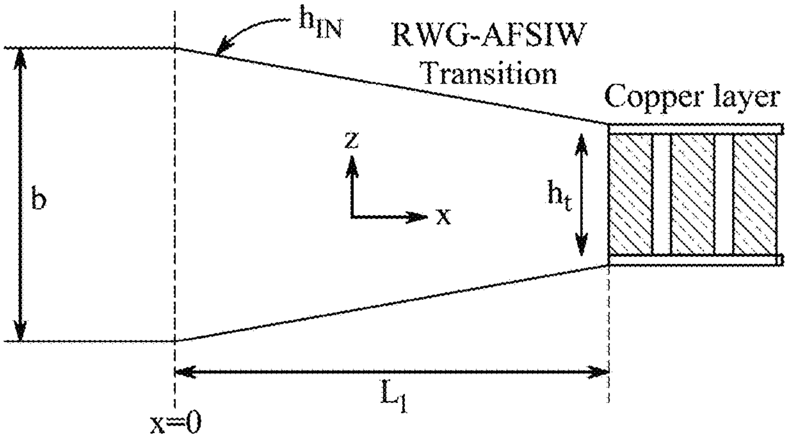
FIG. 1K illustrates the linearly tapered transition between RWG and AFSIW for tapering in in the height dimension, according to certain embodiments.

FIG. 1K illustrates the linearly tapered transition between RWG and AFSIW for tapering-in for the height dimension.

Figure 1L:
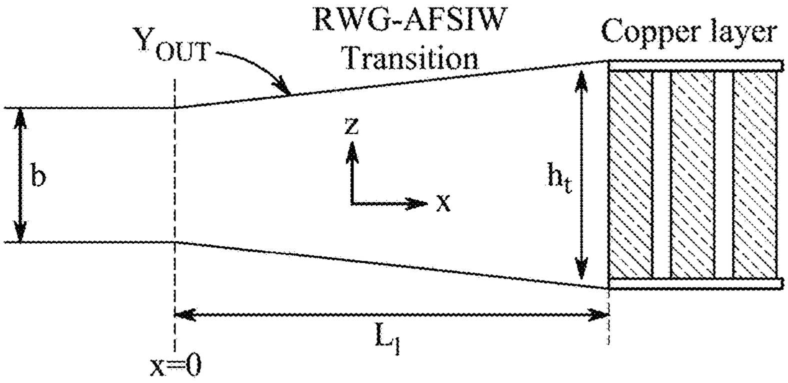
FIG. 1L illustrates the linearly tapered transition between RWG and AFSIW for tapering out in the height dimension, according to certain embodiments.

FIG. 1L illustrates the linearly tapered transition between RWG and AFSIW for tapering out in the height dimension.

The tapered transition is used to transform the characteristic impedance Z(x) that gradually and monotonically varies along the transition length and is defined as:

$$Z(x) = Z_0 + \left(\frac{z_0 \sim z_2}{L_1}\right)x, \tag{2}$$

where $Z_0$ and $Z_2$ the characteristic impedances of RWG and SIW technologies used at other ends of the transition, SIW or AFSIW, respectively. $L_l$ is the length of transition, and x is the distance along the transition length. The different tapered design options taper out and taper in, depending on the aperture size of the RWG ($a_0$ and $b_0$) and the apertures size of the SIW or AFSIW ($a_1$ and $b_1$) connected at the two ends. By taking different configurations of the transition, the linearly varying aperture size expression is derived as given in (3)-(6) and subsequently drawn as shown in FIG. 1D-FIG. 1L. Other configurations are possible but have not been drawn to avoid redundancy. Calculations for deriving the aperture size α of the transition end which mates with the SIW aperture for the different configurations are given by:

$$a = a_0 + (a_1 - a_0)\left[1 - \left(1 - \frac{x}{L_1}\right)\right];\ a_1 > a_0; \quad (3)$$

$$a = a_0 + (a_1 - a_0)\left[1 - \left(1 - \frac{x}{L_1}\right)\right];\ a_0 > a_1; \quad (4)$$

$$b = b_0 + (b_1 - b_0)\left[1 - \left(1 - \frac{x}{L_1}\right)\right];\ b_0 > b_1; \quad (5)$$

$$b = b_1 + (b_0 - b_1)\left[1 - \left(1 - \frac{x}{L_1}\right)\right];\ b_1 < b_0; \quad (6)$$

The length $L_1$ used in these equations is a critical parameter, and it decides the key performances, which include impedance matching, insertion loss, and mode purity of the transition, and its value is of significant concern.

The transition dimensions derived through equations (2) to (6), were modeled by computer simulation.

In order to model the total reflection IT of the different transition design configurations, as shown in FIG. 1C to FIG. 1L, a modified version of an existing technique is implemented, as given below:

$$\Gamma_T = \frac{1}{4\gamma_0}\left(\frac{d}{dx}\ln Z_0\right) - \frac{1}{4\gamma_2}\left(\frac{d}{dx}\ln Z_2\right);\ \exp\left(-2\int_0^{L_1}\gamma_T dx\right) + \Gamma_A \quad (7)$$

where $\gamma_0$ and $\gamma_2$ refer to the propagation constant of the RWG and SIW or AFSIW technologies, while $\gamma_r$ refers to the propagation constant of the transition and $\Gamma_A$ is added to account for reflection caused by various SIW technologies used at the other end of the transition, i.e., SIW or AFSIW.

In the case of an SIW, a dielectric bridge is added which is connected to the substrate, while copper is etched from the top and bottom surfaces and spans across the entire transition length. Copper is utilized in the construction of both the SIW and the AFSIW structures, given that these are waveguide structures implemented on a printed circuit board (PCB). The construction involves a double-layer PCB where the top and bottom layers are interconnected using vias to establish the waveguide configuration. The dielectric bridge, denoted by the upwardly slanting line region in FIG. 1D, is incorporated within the transition, resulting in a partially dielectric-filled transition. For the AFSIW, a more intricate PCB fabrication technique is used, which adds extra layers above and below to bolster the robustness of the structure. In the AFSIW, the dielectric bridge is not added in the transition.

The first transition is interconnected with the rectangular entrance aperture of the SIW 114 by inserting an extension of the dielectric bridge into the transition. A mounting plate (not shown) on the end of the first transition connects to the SIW by screws. The first transition is interconnected with the rectangular entrance of the first RWG 102 by inserting an electrical probe of the first RWG 102 into the first transition.

Similarly, the second transition is interconnected with the rectangular exit aperture of the SIW by inserting an extension of the dielectric bridge into the second transition and connecting a mounting plate (not shown) of the second transition to the rectangular exit aperture by screws. The second transition is interconnected with the rectangular entrance of the second RWG by inserting an electrical probe of the second RWG into the second transition and connecting a ground wire of the coax to a grounding post in the second transition.

For the SIW, the dielectric effect of using the dielectric bridge is modeled using the concept of an effective dielectric as it essentially creates a symmetrically loaded dielectric waveguide. The corresponding reflection is denoted as $T\in_{eff}$, while $\Gamma_A$, in this case, is zero as the impedances become equal at the end of the transition. Thus, the total reflection $\Gamma_T$ in equation (7), in the case of the SIW, becomes $\Gamma_{T\in_{eff}}$ is given by:

$$\Gamma_{T\in_{eff}} = \Gamma_{SIW}; \quad (8)$$

In the case of the AFSIW, $\Gamma_A$ is added to account for the impedance mismatch between the transition and AFSIW, and the overall transition becomes $\Gamma_T$:

$$\Gamma_T = \Gamma_{AFSIW} + \Gamma_A; \quad (9)$$

The detailed mathematical formulation of equations (7) and (8) is discussed below.

The shortest transition length $L_{SIW}$ in the transition design for use with an SIW is the minimum length required, where excellent impedance matching, insertion loss, and high mode purity are achieved. Considering the effective dielectric constant $\in_{eff}$ and using a modified version of an existing technique (See: Dong et al., "*Low profile broadband substrate-integrated waveguide to rectangular waveguide transition for W-band aoutomotive radar*", Electron. lett., Vol. 56, No. 22, pp. 1186-1189, incorporated herein by reference in its entirety), the total reflection $\Gamma_{SIW}$, in this case, is modelled as:

$$|\Gamma_{SIW}| = \frac{1}{\frac{L_1}{\lambda_0}}\sqrt{\frac{K_0^2 + K_1^2}{64\pi^2} - \frac{K_0 K_1}{32\pi^2}\cos(4\pi l)}; \quad (10)$$

where, $$K_0 = \frac{\frac{(b_1 - b_0)}{b_0} - \frac{a_1 - a_0}{a_0}\left(\frac{\epsilon_{eff}}{\epsilon_{eff} - \left(\frac{\lambda_0}{2a_0}\right)^2}\right)}{\left(\epsilon_{eff} - \left(\frac{\lambda_0}{2a_0}\right)^2\right)^{\frac{1}{2}}}; \quad (11)$$

$$K_1 = \frac{\frac{(b_1 - b_0)}{b_0} - \frac{a_1 - a_0}{a_0}\left(\frac{\epsilon_{eff}}{\epsilon_{eff} - \left(\frac{\lambda_0}{2a_0}\right)^2}\right)}{\left(\epsilon_{eff} - \left(\frac{\lambda_0}{2a_0}\right)^2\right)^{\frac{1}{2}}}; \quad (12)$$

$$l = \frac{L_1}{3(a_1 - a_0)}\left(\frac{2a_1}{\lambda_{g_1}} - \frac{2a_0}{\lambda_{g_0}} + \tan^{-1}\left(\frac{2a_0}{\lambda_{g_0}}\right) - \tan^{-1}\left(\frac{2a_1}{\lambda_{g_1}}\right)\right); \quad (13)$$

$$\lambda_{g_0} = \frac{\lambda_0}{\sqrt{\epsilon_{eff} - \left(\frac{\lambda_0}{2a_0}\right)^2}}; \quad (14)$$

$$\lambda_{g_1} = \frac{\lambda_0}{\sqrt{\epsilon_{eff} - \left(\frac{\lambda_0}{2a_1}\right)^2}}; \quad (15)$$

In equation (9), the operational wavelengths of the RWG, are calculated at 50 GHz and 75 GHz for WR-15 and WR-10 waveguides, respectively. The "WR" designation stands for rectangular waveguide. The number that follows "WR" is the width of the waveguide opening in mils, divided by 10. For example, WR-15 means a waveguide whose cross section width is 150 mils.

To verify the modeled equation, simulated results of the voltage standing wave ratio (VSWR) versus transition length for different waveguide substrate heights were generated, as shown in FIG. 2A to FIG. 3B for WR-15 and WR-10 waveguides, respectively. The graphs suggest that the modeled and simulated results had a good correlation. Thus, the accuracy of $\Gamma_{SIW}$ expression is proven to describe the behavior of the RWG to SIW transition designs. Finally, the mathematical expression obtained in equation (9) is analytically solved, and a simplified expression for $L_1$ to calculate the shortest possible transition length $L_{SIW}$ when $|\Gamma_{SIW}| \cong 0.1$ or VSWR<1.3 is obtained. A length $L_{SIW}$ of the tapered body of the first hollow metallic structure and the second hollow metallic structure between the respective rectangular first end and rectangular second end is given by:

$$L_{SIW} \cong 0.35\sqrt{K_0^2\lambda^2 + K_1^2\lambda^2}; \tag{16}$$

where $\lambda$ is a frequency of the millimeter wave transmitted through the transition apparatus, K0 and K1 are given by equations (11) and (12) where $\lambda_0$ is a resonant frequency of the second RWG and $\varepsilon_{eff}$ is an effective dielectric constant of the SIW. In an aspect of the present disclosure in which an AFSIW is used as the SIW, $\varepsilon_{eff}$ is an effective dielectric constant of the AFSIW.

To validate equation (16), values for WR-15 and WR-10 waveguides having different substrate heights were evaluated analytically and compared with the simulated values. The results are summarized in Table 1. As observed from Table 1, the analytical and the simulated $L_{SIW}$ bear a close resemblance.

TABLE 1

Comparison of simulated and analytical transition length

| Transition Configuration | Substrate Height (mm) | Shortest Transition Length (mm) Analytical | Shortest Transition Length (mm) Simulated VSWR (<1.3) |
|---|---|---|---|
| WR-15 to SIW | 0.127 | 31 | 30 |
| | 0.252 | 14 | 15 |
| | 0.575 | 4.47 | 4 |
| | 0.787 | 2.53 | 2.5 |
| WR-10 to SIW | 0.127 | 12 | 13.5 |
| | 0.252 | 5.7 | 5.8 |
| | 0.575 | 2.5 | 2.65 |
| | 0.787 | 1.7 | 2 |
| WR-15 to AFSIW | 0.252 | 22.57 | 22 |
| | 0.575 | 16.8 | 15 |
| | 1.575 | 2.65 | 2.6 |
| | 3.175 | 2.78 | 2.8 |
| WR-10 to AFSIW | 0.252 | 8.7 | 8 |
| | 0.575 | 4.57 | 3.7 |
| | 0.787 | 3 | 3.45 |

A similar method, as discussed above for the RWG to SIW transition, is followed, where an additional term $\Gamma_A$, as expressed in (8), represents the impedance mismatch between the transition and the AFSIW. The final reflection expression $\Gamma_{AFSIW}$ is expressed as:

$$|\Gamma_{AFSIW}| = \frac{1}{\frac{L_1}{\lambda_0}}\sqrt{\left(\frac{K_0^2 + K_1^2}{64\pi^2}\right) - \left(\frac{K_0K_1}{32\pi^2}\right)\cos(4\pi l)} + \Gamma_A \tag{18}$$

-continued where, $$K_0 = \frac{\left(\frac{b_1 - b_0}{b_0}\right) - \frac{\left(\frac{a_1 - a_0}{a_0}\right)}{\left(a - \left(\frac{\lambda_0}{2a_0}\right)^2\right)}}{\sqrt{\left(1 - \left(\frac{\lambda_0}{2a_0}\right)^2\right)}}; \tag{19}$$

$$K_1 = \frac{\left(\frac{b_1 - b_0}{b_1}\right) - \frac{\left(\frac{a_1 - a_0}{a_1}\right)}{\left(1 - \left(\frac{\lambda_0}{2a_1}\right)^2\right)}}{\sqrt{\left(1 - \left(\frac{\lambda_0}{2a_1}\right)^2\right)}}; \tag{20}$$

$$\Gamma_A = \frac{a_1\sqrt{4 - \frac{\lambda_0^2}{a_1^2}}\left(W^3\sqrt{\varepsilon_r} + 2w_1^3\right) - 2\left(W^2 + 2w_1^2\right)^2\sqrt{\varepsilon_r}\sqrt{1 - \frac{0.0625\lambda_0^2}{(W - 1.25w_1)^2}}}{2\left(W^2 + 2w_1^2\right)^2\sqrt{\varepsilon_r}\sqrt{1 - \frac{0.0625\lambda_0^2}{(W - 1.25w_1)^2}} + a_1\sqrt{4 - \frac{\lambda_0^2}{a_1^2}}\left(W^3\sqrt{\varepsilon_r} + 2w_1^3\right)}; \tag{21}$$

$$l = \frac{L_1}{\lambda_0}\left\{1 - \frac{1}{8}\left(\frac{\lambda_0}{a_1 - a_0}\right)\left[\left(\frac{\lambda_0}{a_0}\right) - \left(\frac{\lambda_0}{a_1}\right)\right]\right\};$$

A similar analysis in the case of RWG to AFSIW transition, the VSWR results are plotted in FIG. 5A, 5B and FIG. 6A, 6B, and an excellent match between the modeled and simulated results across the full range of WR-15 and WR-10 were observed. Similarly solving (16), a simplified expression for $L_{AFSIW}$ when $T_{AFSIW} \cong 0.1$ is determined as:

$$L_{AFSIW} \cong 0.35\sqrt{K_0^2\lambda^2 + K_1Z^2\lambda^2}; \tag{22}$$

The validity of equation (22) was confirmed by assessing its values for WR-15 and WR-10 at various substrate heights and comparing them with simulated results, as detailed in Table 1. The comparison showed a close match between the modelled and simulated values of $L_{AFSIW}$, affirming the accuracy of the developed equation for analytically determining $L_{AFSIW}$.

FIG. 2A-FIG. 3B present analytical and simulated results of Voltage Standing Wave Ratio (VSWR) as a function of transition length for Rectangular Waveguide to Substrate Integrated Waveguide (RWG to SIW) transitions.

Figure 2A:
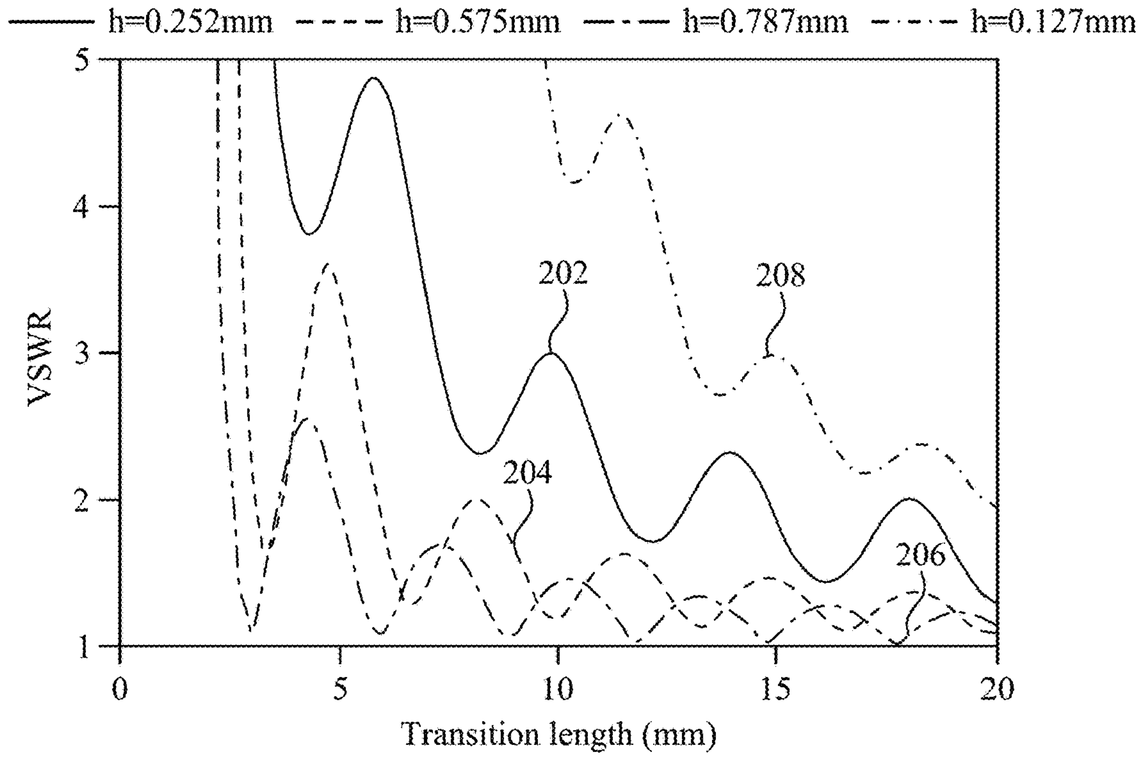
FIG. 2A illustrates analytical (voltage standing wave ratio) VSWR versus transition length results at a 50 GHz operational frequency pertaining to WR-15 waveguide length dimensions for different SIW substrate heights h, according to certain embodiments.

In FIG. 2A, the analytical VSWR versus transition length results for a 50 GHz operational frequency pertaining to WR-15 waveguide dimensions are plotted. The curves represent different substrate heights. Curve 202 for h=0.252 mm, Curve 204 for h=0.575 mm, Curve 206 for h=0.787 mm, and Curve 208 for h=0.127 mm are plotted. Each curve shows the VSWR variation across the transition length ranging from 0 to 20 mm. A lower VSWR is desirable as it indicates better impedance matching. It is observed that as the substrate height increases, the VSWR tends to decrease, suggesting improved impedance matching at certain transition lengths.

Figure 2B:
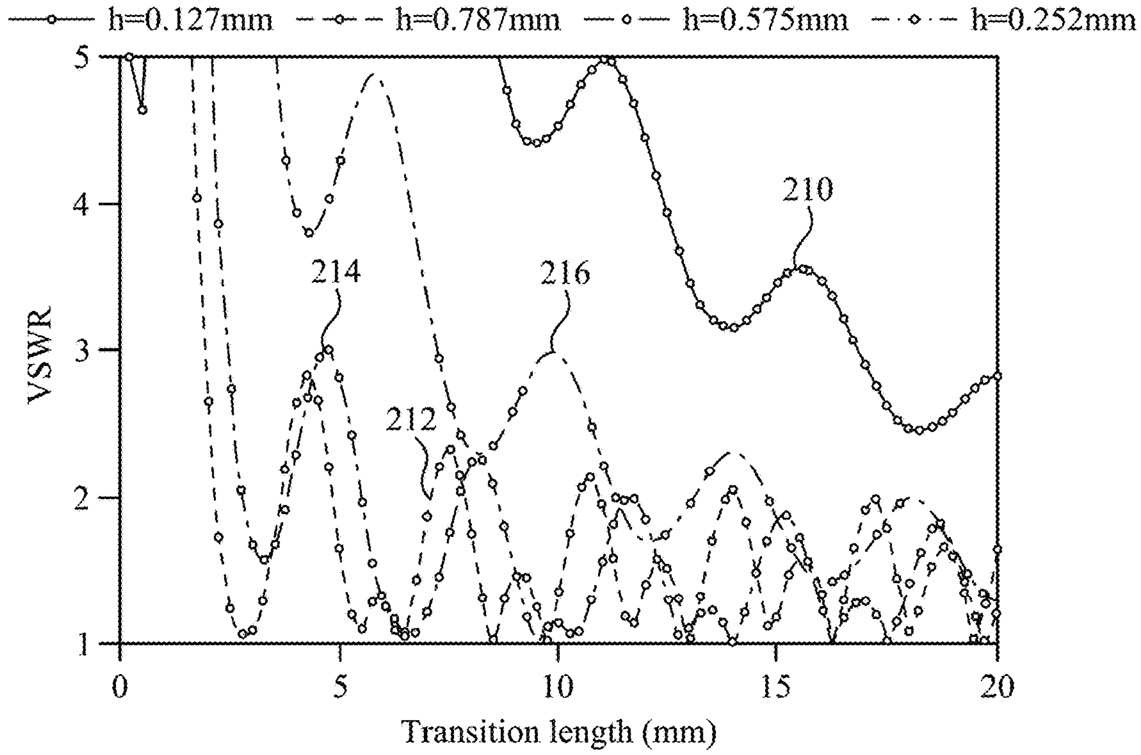
FIG. 2B provides the simulated VSWR versus transition length results corresponding to the analytical results for a 50 GHz operational frequency pertaining to WR-15 waveguide length dimensions for different SIW substrate heights h, according to certain embodiments.

FIG. 2B provides the simulated VSWR versus transition length results corresponding to the analytical results of FIG. 2A for the same WR-15 waveguide dimensions at 50 GHz. The curves represent different substrate heights. Curve 216 for h=0.252 mm, Curve 214 for h=0.575 mm, Curve 212 for h=0.787 mm, and Curve 210 for h=0.127 mm are plotted. The simulated data points are overlaid on the analytical curves, displaying a close correlation between the modelled and simulated outcomes. This congruence validates the accuracy of the proposed ΓSIW expression and its predictive capability for the RWG to SIW transition behaviour.

Figure 3A:
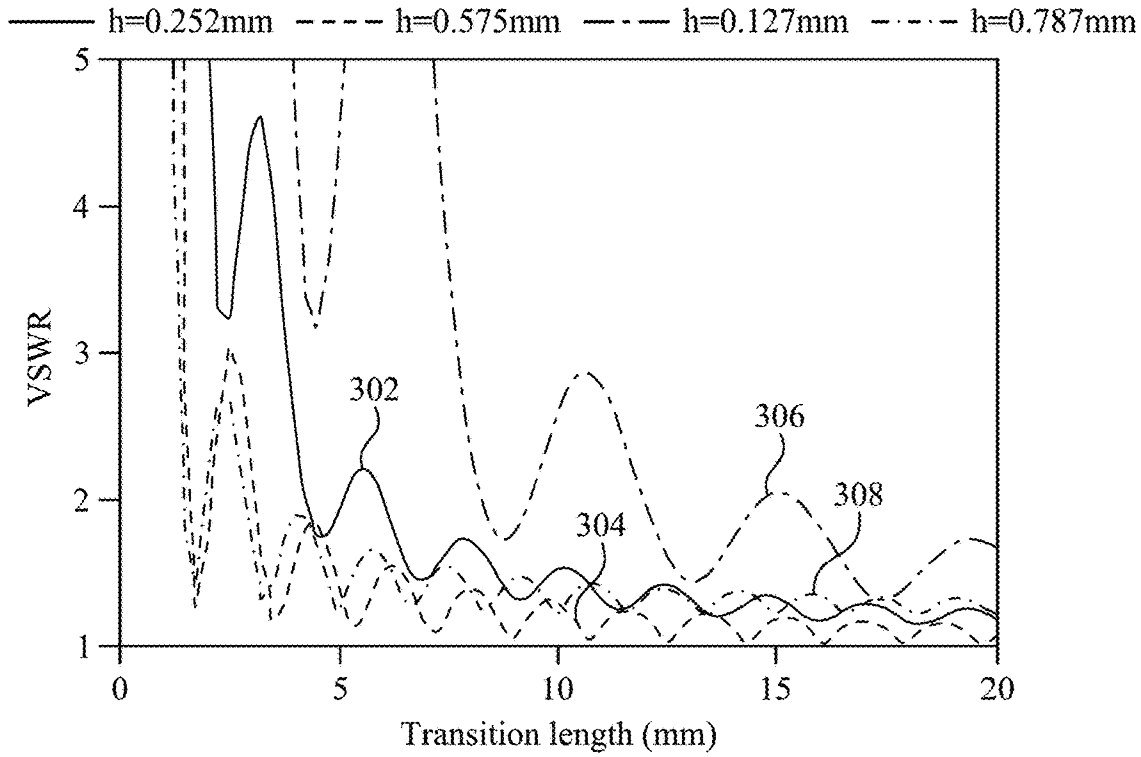
FIG. 3A depicts the analytical VSWR versus transition length results for WR-10 waveguide dimensions of 75 GHz for different SIW substrate heights h, according to certain embodiments.

In FIG. 3A, the analytical VSWR versus transition length for a higher frequency of 75 GHz, associated with WR-10 waveguide dimensions, are depicted. The curves represent different substrate heights. Curve 302 for h=0.252 mm, Curve 304 for h=0.575 mm, Curve 306 for h=0.787 mm, and Curve 308 for h=0.127 mm are plotted. Similar to FIG. 2A, multiple substrate heights were analysed, showing how the VSWR changes with varying transition lengths. Here too, the trend indicates that VSWR improves with certain substrate heights, affirming the effect of substrate height on impedance matching.

Figure 3B:
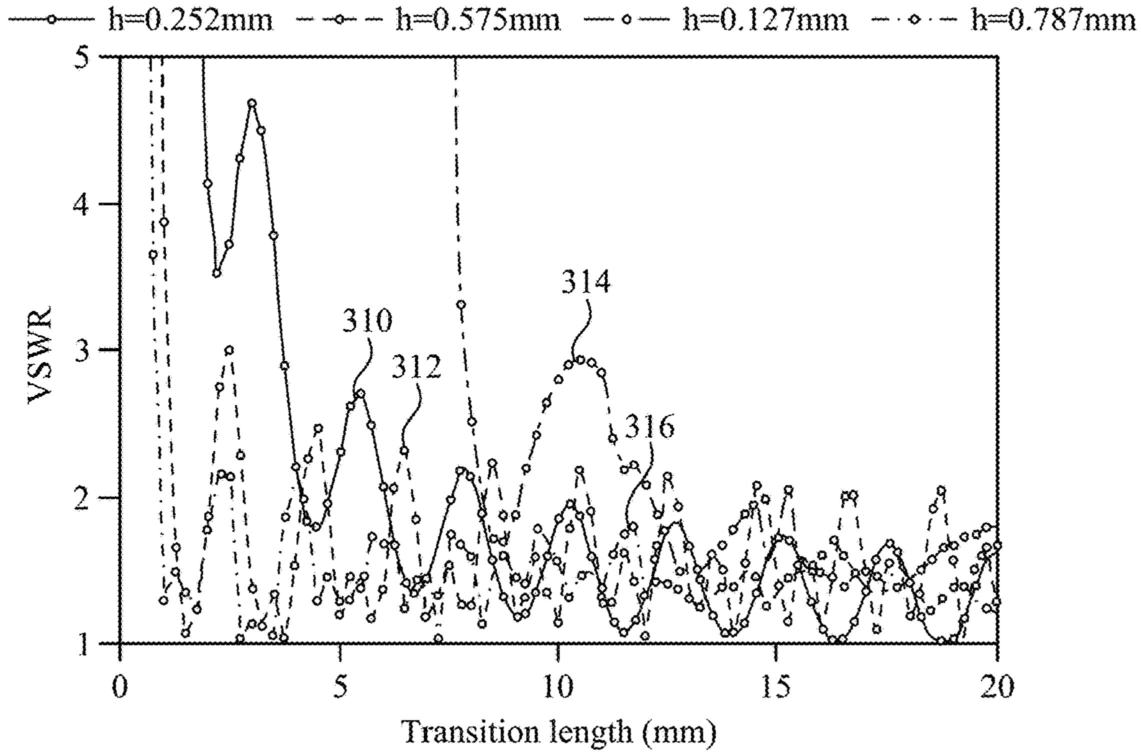
FIG. 3B illustrates the simulated VSWR versus transition length results for WR-10 waveguide dimensions at 75 GHz for different SIW substrate heights h, according to certain embodiments.

FIG. 3B illustrates the simulated VSWR versus transition length results for WR-10 waveguide dimensions at 75 GHz. The curves represent different substrate heights. Curve 310 for h=0.252 mm, Curve 312 for h=0.575 mm, Curve 314 for h=0.787 mm, and Curve 216 for h=0.127 mm are plotted. These results align with the analytical predictions of FIG. 3A, further reinforcing the accuracy of the developed models.

Figure 4:
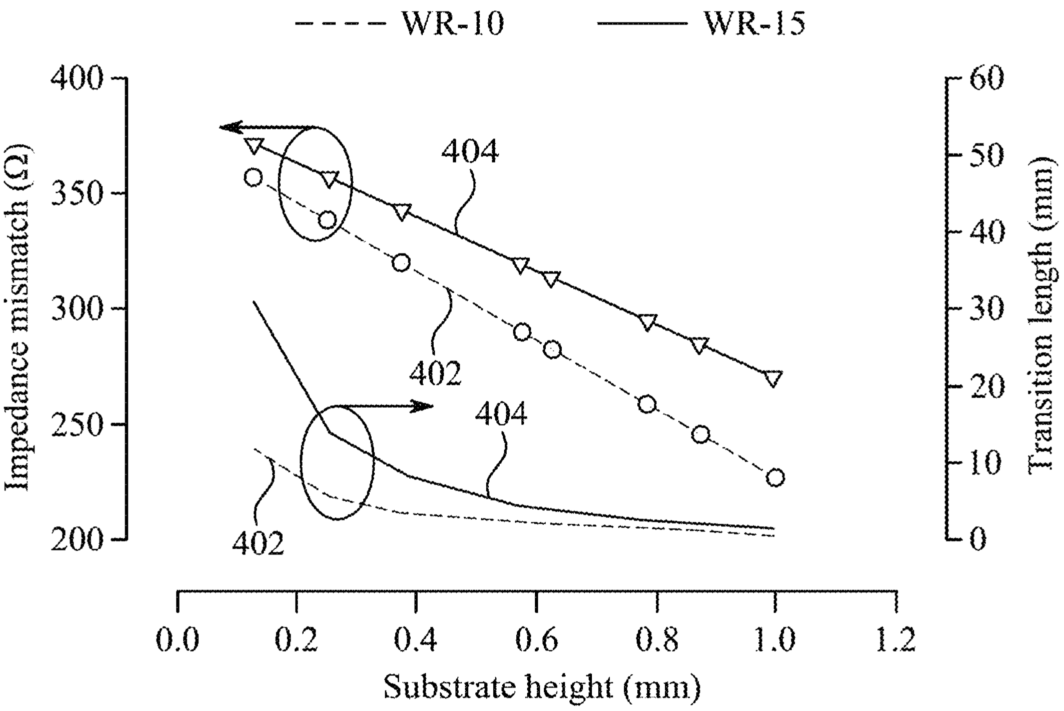
FIG. 4 presents illustrates the relationship between the substrate height and its corresponding impact on the impedance mismatch and transition length for various SIW substrate heights for both WR-10 and WR-15 waveguide dimensions, according to certain embodiments.

FIG. 4 presents a graphical representation of the relationship between the substrate height and its corresponding impact on the impedance mismatch and transition length for the proposed RWG to SIW transition design.

The graph plots two curves that illustrate how the analytically calculated length of the Substrate Integrated Waveguide ($L_{SIW}$) varies with substrate height for a transition to SIW. The Length of Substrate Integrated Waveguide ($L_{SIW}$) refers to the transition length of a Substrate Integrated Waveguide, which is a type of waveguide where the wave propagation is confined within a substrate material. Each curve is associated with a different waveguide specification, with curve 402 representing WR-10 and curve 404 representing WR-15.

As indicated by the downward trend of the curves 402 and 404, there is a decrease in impedance mismatch as the substrate height increases. Conversely, the transition length, denoted on the secondary vertical axis on the right, exhibits a minimum at a specific substrate height, implying an optimal point for the transition design. This shows that the higher the impedance mismatch from the RWG impedance, the larger the transition length must be made.

For WR-10, on curve 402, the impedance mismatch decreases more significantly with an increase in substrate height compared to WR-15, on curve 404. This suggests that the impedance matching is more sensitive to changes in substrate height for WR-10 than for WR-15.

Additionally, the data points on the graph show that as the substrate height increases from this optimal point, the required $L_{SIW}$ to optimize transition performance increases. The graph, thus, indicates that there is an optimal substrate height that minimizes the impedance mismatch and, therefore, the transition length for the most efficient signal transfer between the RWG and the SIW.

Figure 5A:
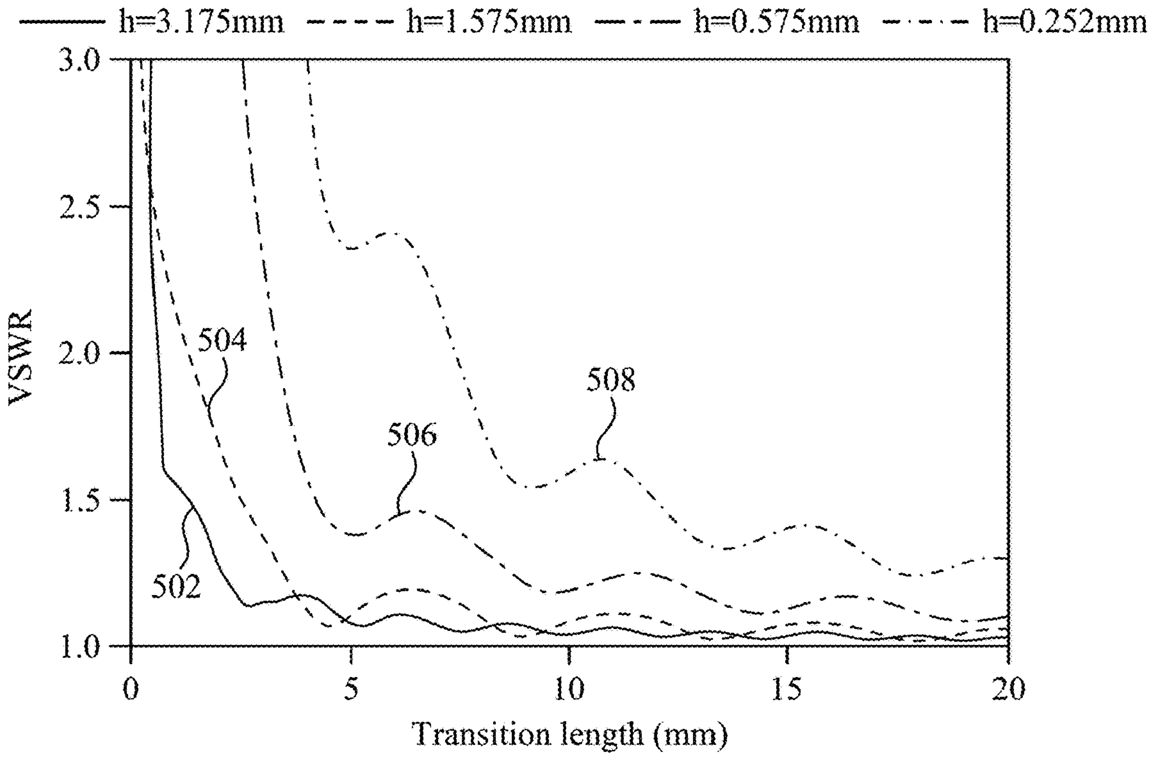
FIG. 5A illustrates the analytical (voltage standing wave ratio) VSWR versus transition length results at a 50 GHz operational frequency pertaining to WR-15 waveguide length dimensions for different AFSIW substrate heights, according to certain embodiments.
Figure 5B:
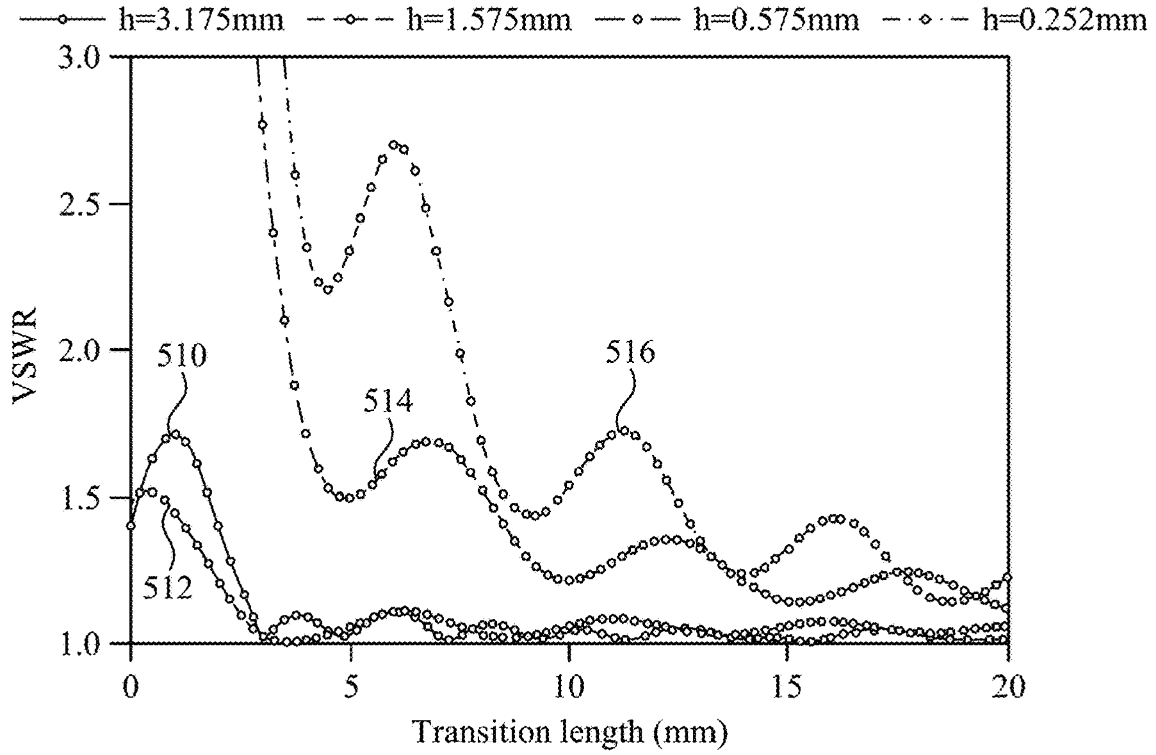
FIG. 5B illustrates the simulated VSWR versus transition length results corresponding to the analytical results for a 50 GHz operational frequency pertaining to WR-15 waveguide length dimensions for different AFSIW substrate heights, according to certain embodiments.
Figure 6A:
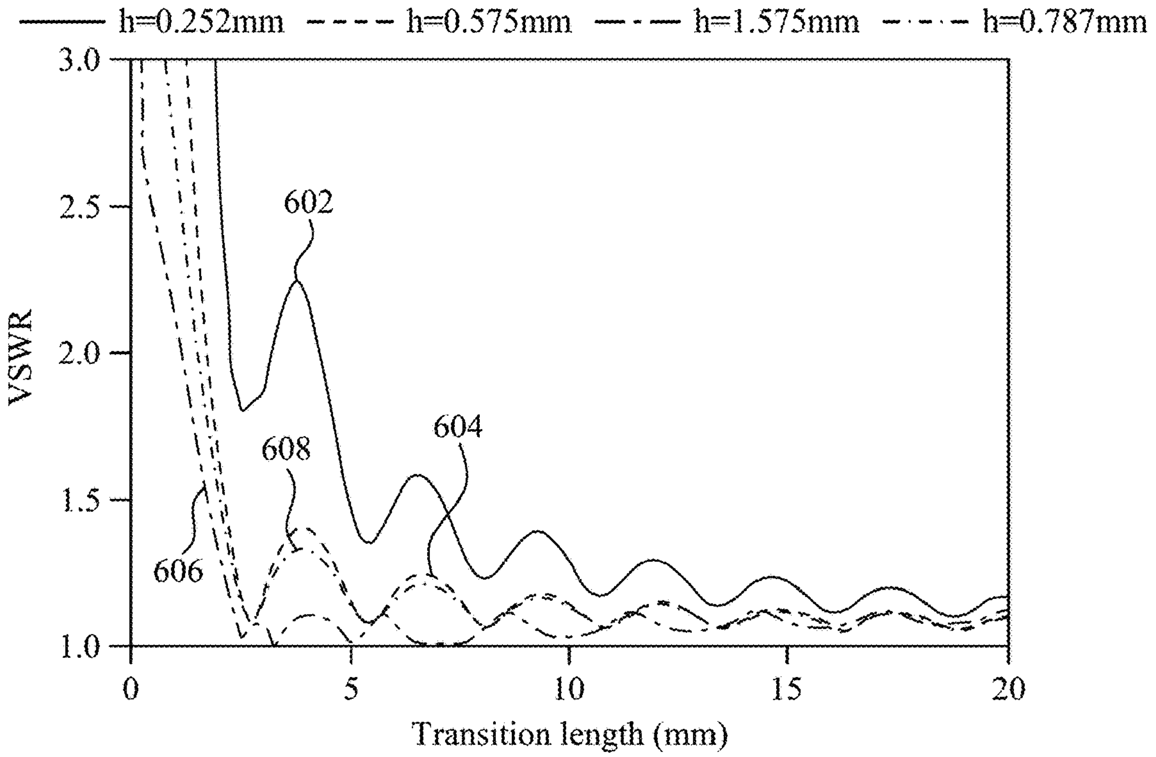
FIG. 6A displays the analytical VSWR versus transition length results for WR-10 waveguide dimensions of 75 GHz for different AFSIW substrate heights, according to certain embodiments.
Figure 6B:
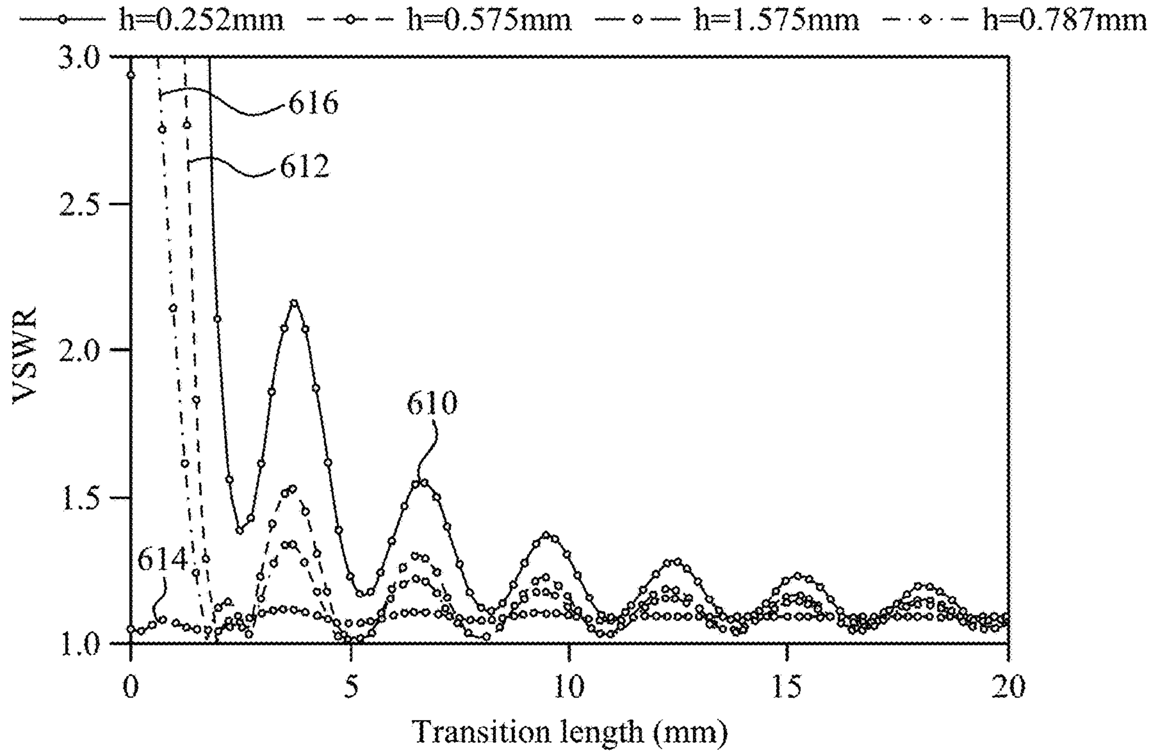
FIG. 6B illustrates the simulated VSWR versus transition length results for WR-10 waveguide dimensions at 75 GHz for different AFSIW substrate heights, according to certain embodiments.

FIG. 5A, FIG. 5B, FIG. 6A and FIG. 6B display the Voltage Standing Wave Ratio (VSWR) outcomes versus transition length for transitions from WR-15 and WR-10 to Air-Filled Substrate Integrated Waveguide (AFSIW) at different frequencies, with FIG. 5A and FIG. 5B associated with 50 GHz and FIG. 6A and FIG. 6B associated with 75 GHz. The VSWR is a measure used to quantify how well a transmission line is matched to its load, or in other words, how efficiently RF power is transmitted from one section of the transmission path to another.

FIG. 5A illustrates the comparison of VSWR versus transition length results at different substrate heights h for WR-15 to AFSIW transition at 50 GHz. The analytical data reveals that the VSWR tends to decrease with increasing substrate height. Curves indicate the substrate heights, curve 502 is for h=3.175 mm, curve 504 is for h=1.575 mm, curve 506 is for h=0.787 mm, and curve 508 is for h=0.252 mm shows a progressive decrease in VSWR with an increase in 'h'. An optimal VSWR, which is closest to 1, is desirable as it indicates minimal signal reflection and better impedance matching.

FIG. 5B illustrates simulated results depicting comparison of VSWR versus transition length results at different substrate heights h for WR-15 to AFSIW transition at 50 GHz. The graph shows that the simulated results, aligns closely with the analytical findings of FIG. 5A. Curve 510 is plotted for h=3.175 mm, curve 512 is plotted for h=1.575 mm, curve 514 is plotted for h=0.787 mm, and curve 516 is plotted for h=0.252 mm. The curves reflect a similar trend of decreasing VSWR with increased substrate height, confirming the validity of the analytical model.

FIG. 6A and FIG. 6B depicts the VSWR characteristics versus transition length results for the WR-10 to AFSIW transition at 75 GHz, comparing different substrate heights. FIG. 6A displays the analytical VSWR values across the transition length for various substrate heights, showing that VSWR improves as the substrate height increases. The curves indicate the transition length against the VSWR. Curve 602 presents h=0.252 mm, curve 604 presents h=0.575 mm, curve 606 presents h=1.575 mm, and curve 608 presents h=0.787 mm.

Correspondingly, FIG. 6B depicts the simulated VSWR results. These results demonstrate a good match with the analytical predictions, underscoring the reliability of the modeling approach. Curve 610 presents h=0.252 mm, curve 612 presents h=0.575 mm, curve 614 presents h=1.575 mm, and curve 616 presents h=0.787 mm.

Figure 7:
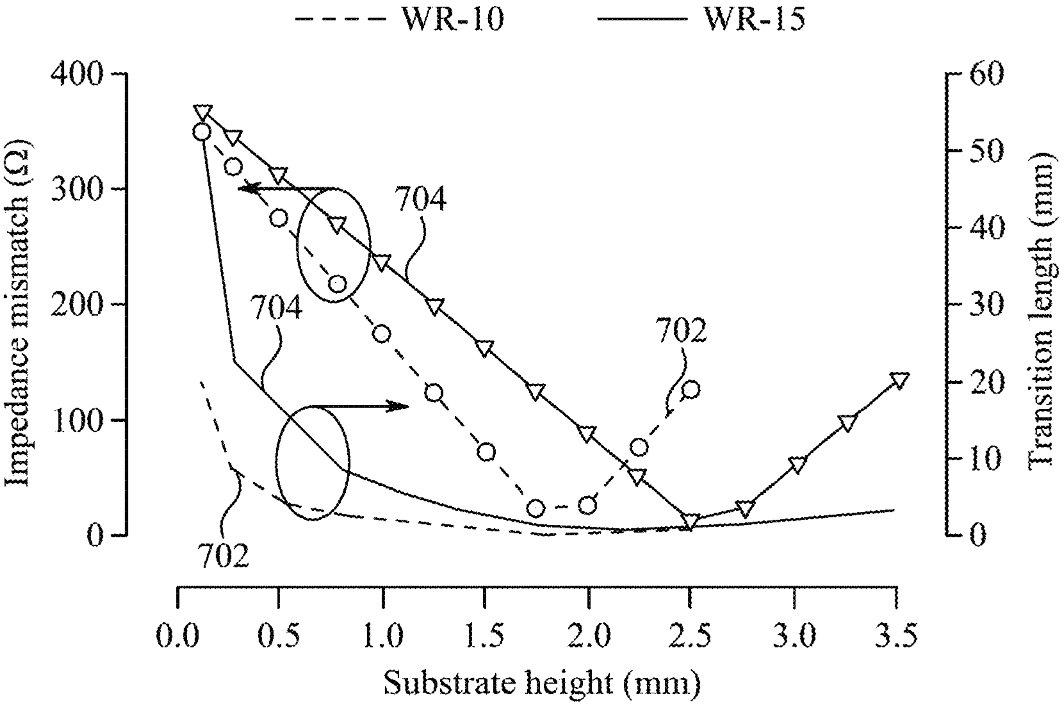
FIG. 7 illustrates the relationship between the substrate height and its corresponding impact on the impedance mismatch and transition length for various AFSIW substrate heights for both WR-10 and WR-15 waveguide dimensions, according to certain embodiments.

FIG. 7 illustrates the variation in analytically calculated transition length, Length of Air-Filled Substrate Integrated Waveguide ($L_{AFSIW}$), as a function of substrate height, and the corresponding impedance mismatch for the proposed RWG to AFSIW transition for both WR-10 and WR-15 waveguide dimensions. As the impedance mismatch increases, the transition length must increase to compensate.

The graph features two sets of curves, each representing different waveguide specifications. Curve 702 represents WR-10 and curve 704 represents WR-15.

Figure 8:
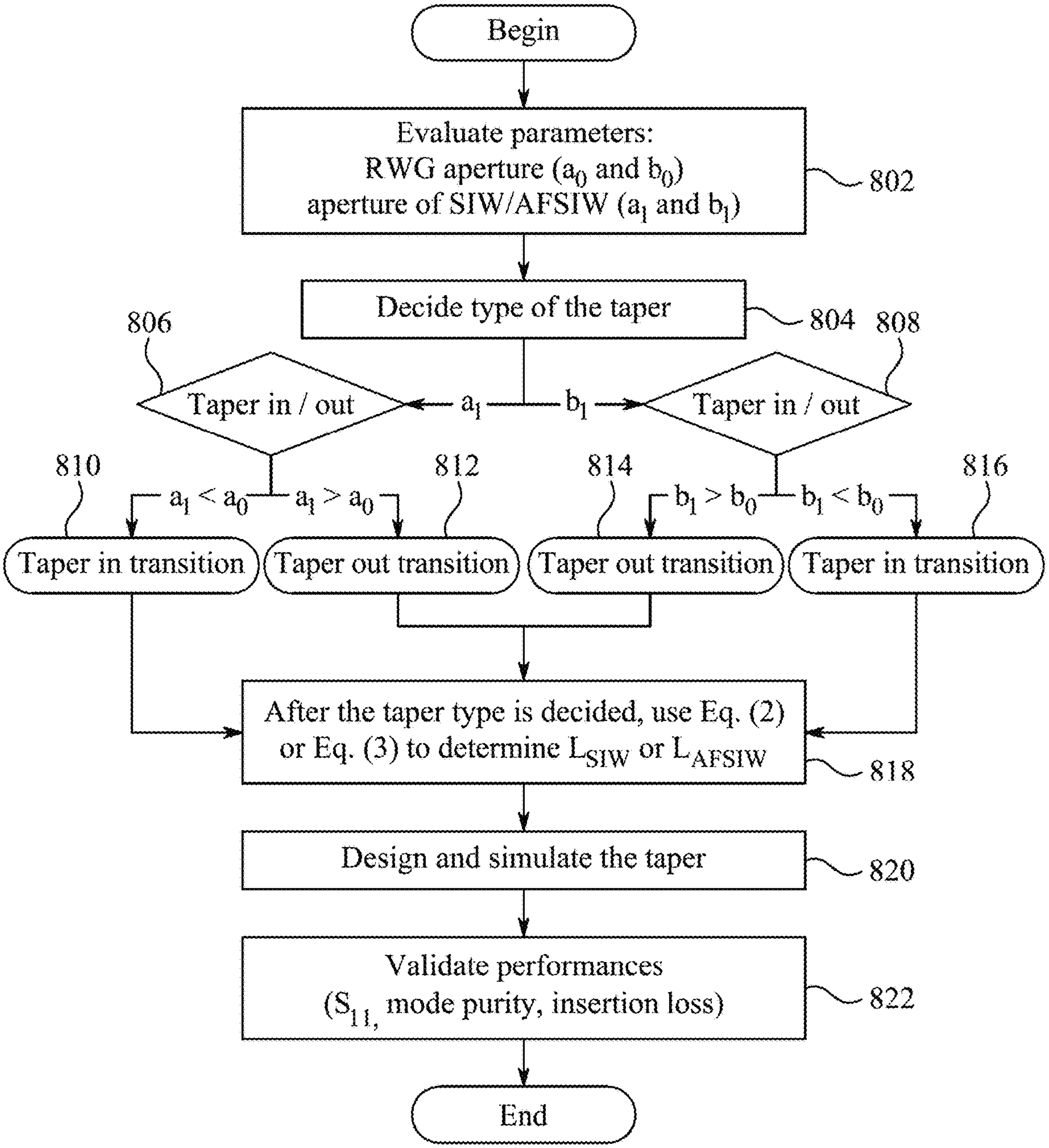
FIG. 8 illustrates a flowchart for designing the millimeter-wave transition apparatus, according to certain embodiments.

FIG. 8 illustrates a procedural flowchart for designing the millimeter-wave transition apparatus, which facilitates the interconnection of a rectangular waveguide (RWG) with a substrate integrated waveguide (SIW), including air-filled SIW (AFSIW).

The process begins with an evaluation of the relevant parameters at step 802. Step 802 includes obtaining a characteristic impedance $Z_0$ of the RWG and a characteristic impedance $Z_2$ of the SIW or the AFSIW, obtaining a width $a_0$ and a height $b_0$ of the RWG, obtaining a width $a_1$ and a height $b_1$ of the SIW, and obtaining a resonant frequency $\lambda_0$ of the RWG and, in the case of the SIW, an effective dielectric constant $\varepsilon_{eff}$.

At step 804, a decision is made concerning the type of taper required for the transition post the evaluation. This decision is based on a comparison of the apertures of the RWG and the SIW/AFSIW, steps 806 and 808.

If the RWG width $a_0$ is less than the SIW/AFSIW width $a_1$, a taper in transition is implemented, at step 810. Conversely, if $a_0$ is greater than $a_1$, a taper out transition is selected at step 812. A similar decision process is followed for the RWG height $b_0$ in relation to the SIW/AFSIW height $b_1$ to determine whether a taper in or taper out transition is appropriate, steps 814 and 816, respectively.

Upon determining the type of taper, the transition length of the SIW ($L_{SIW}$) or the transition length of the AFSIW ($L_{AFSIW}$) is calculated using the appropriate equations, such as equation (2) or equation (3) of the present disclosure, at step 818. The calculation is performed by a computing device including a memory storing program instruction and at least one processor configured to execute the program instructions, a shortest length $L_{SIW}$ or $L_{AFSIW}$ of the transition structure which matches the impedance of the SIW aperture or the AFSIW aperture, respectively. The shortest length is in the range of about 1 mm to about 15 mm for an SIW aperture height in the range of about 0.2 mm to about 1.0 mm, has a voltage standing wave ratio in the range of about 1 to about 5 for transition lengths of about 3 mm to about 20 mm and for SIW substrate heights of about 0.127 mm to about 0.787 mm, has a total reflection coefficient IT in the range of about −20 dB to about −10 dB and has modal purity in a range of about −1 dB to about 0.25 dB in a dominant mode and about −125 dB to about −75 dB in a non-dominant mode during a transmission of a millimeter wave having a frequency λ in the range of about 50 GHz to about 75 GHz through the transition apparatus.

With the dimensions defined, the taper is designed and simulated, at step 820, to ensure that the resulting structure meets the specific performance criteria.

The performance of the transition is then validated, at step 822, confirming its effectiveness by evaluating the voltage standing wave ratio (VSWR), mode purity, and insertion loss. Mode purity refers to the extent to which a particular mode, such as the dominant TE10 mode in rectangular waveguides, is the exclusive mode of propagation in the waveguide, with minimal presence or interference from other modes. High mode purity is desirable as it means the signal is transmitted with minimal distortion. Insertion loss is the amount of signal power lost due to the introduction of the transition (or any other component) into the waveguide path. It is typically expressed in decibels (dB) and represents the ratio of power output to power input. Lower insertion loss means that the transition is efficient, with most of the signal power making it through from one end of the transition to the other.

Figure 9:
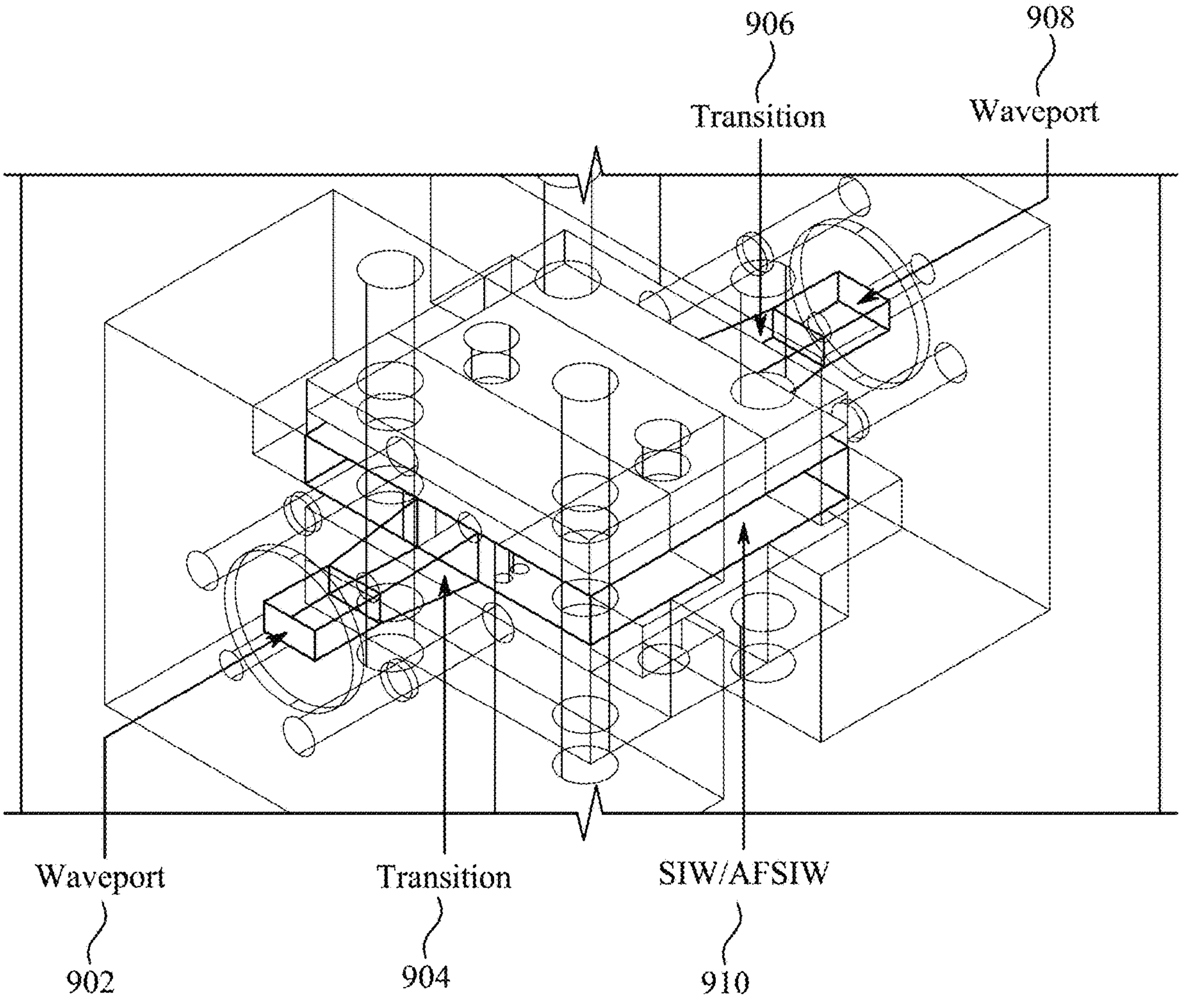
FIG. 9 depicts a transmission system setup utilizing the transition design to measure scattering parameters S11 and S21, according to certain embodiments.

FIG. 9 depicts a transmission system utilizing the transition design of the present disclosure to measure scattering parameters $S_{11}$ and $S_{21}$, which are indicative of reflection and transmission coefficients, respectively.

The system setup includes a waveport 902, which serves as the entry point for the signal into the transmission system. The waveport 902 is a waveguide port that initiates the electromagnetic wave into the system for measurement purposes.

The system setup further includes transition region 904. This is the initial transition from the waveport 902 (also referred to the RWG) to SIW/AFSIW 910, which facilitates the conversion of the waveguide mode to a planar transmission mode compatible with the SIW. The transition is designed according to the procedure outlined in FIG. 8.

Hence, in the transition to SIW/AFSIW 910, the primary wave propagation occurs after the transmission from the rectangular waveguide.

The transition region 906 is the second transition, as shown in FIG. 1C, that mirrors the first transition, 904, allowing for the signal to move from the SIW/AFSIW back to a waveguide mode. Transition 906 is designed to be the reciprocal of transition 904 to ensure symmetry in the transmission system.

A waveport 908 is the terminal where the signal exits the system. The waveport 908 is configured for measuring the transmitted signal's properties and finalizing the S21 parameter.

Using the system setup, the transmission system's performance can be evaluated, particularly by looking at how well the transitions perform in terms of reflecting ($S_{11}$) and transmitting ($S_{21}$) the signal across the SIW/AFSIW section. The efficient design of the transitions of the present disclosure yields minimal reflection and optimal transmission, which are essential for high-performance millimeter-wave communication systems.

Figure 10A:
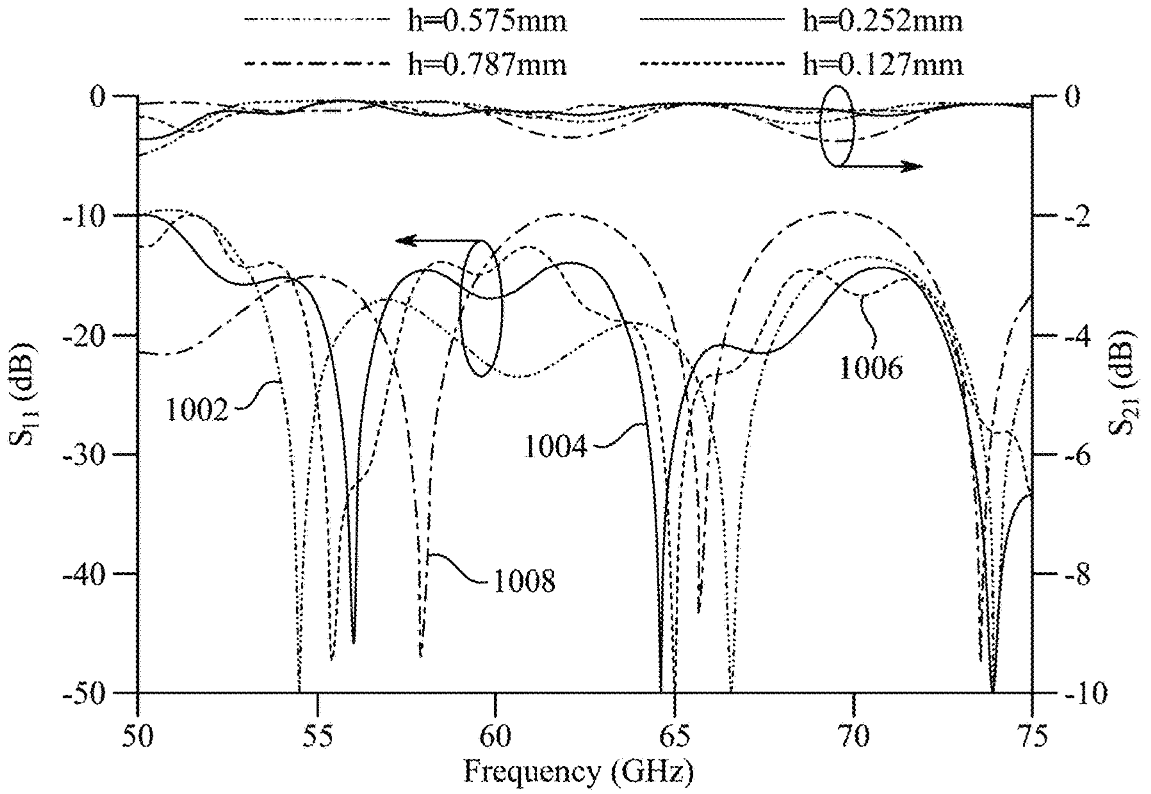
FIG. 10A illustrates S11 and S21 versus frequency for the WR-15 to SIW transition plotted across a frequency range from 50 to 75 GHz for different substrate heights, according to certain embodiments.

FIG. 10A and FIG. 10 B present simulated results for $S_{11}$ (indicated by the circle pointing to the left axis) and $S_{21}$ (indicated by the circle pointing to the right axis), which are reflection and transmission coefficients respectively, for transmission systems incorporating transitions from WR-15 to SIW and WR-10 to SIW, respectively using Rogers 5880 material.

In FIG. 10A, for the WR-15 to SIW transition, S11 and S21 are plotted across a frequency range from 50 to 75 GHz for different substrate heights. The various curves depict how the S11 parameter improves with specific substrate heights, illustrating how closely matched the impedances of the waveguide and the transition are at different frequencies. Curve 1002 for h=0.575 mm, curve 1004 for h=0.252 mm, curve 1006 for h=0.127 mm, and curve 1008 for h=0.787 mm are plotted.

Figure 10B:
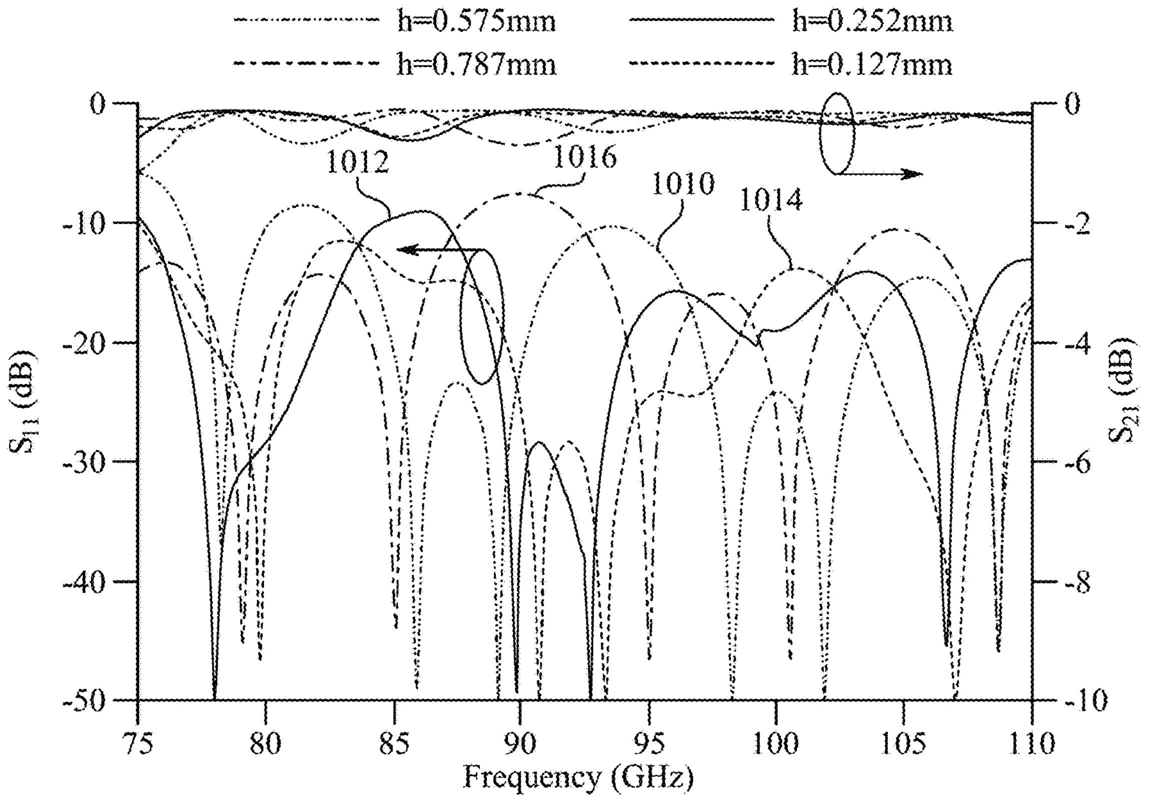
FIG. 10B illustrates the WR-10 to SIW transition related S11 and S21 parameters versus frequency over a frequency range extending from 75 to 110 GHz according to certain embodiments.

FIG. 10B illustrates the WR-10 to SIW transition and S11 and S21 parameters over a broader frequency range, extending from 75 to 110 GHz. The patterns of the curves generally follow the same trends as those for WR-15, indicating consistent performance in the transmission characteristics for different substrate heights in both waveguide types. Curve 1010 for h=0.575 mm, curve 1012 for h=0.252 mm, curve 1014 for h=0.127 mm, and curve 1016 for h=0.787 mm are plotted.

Figure 11A:
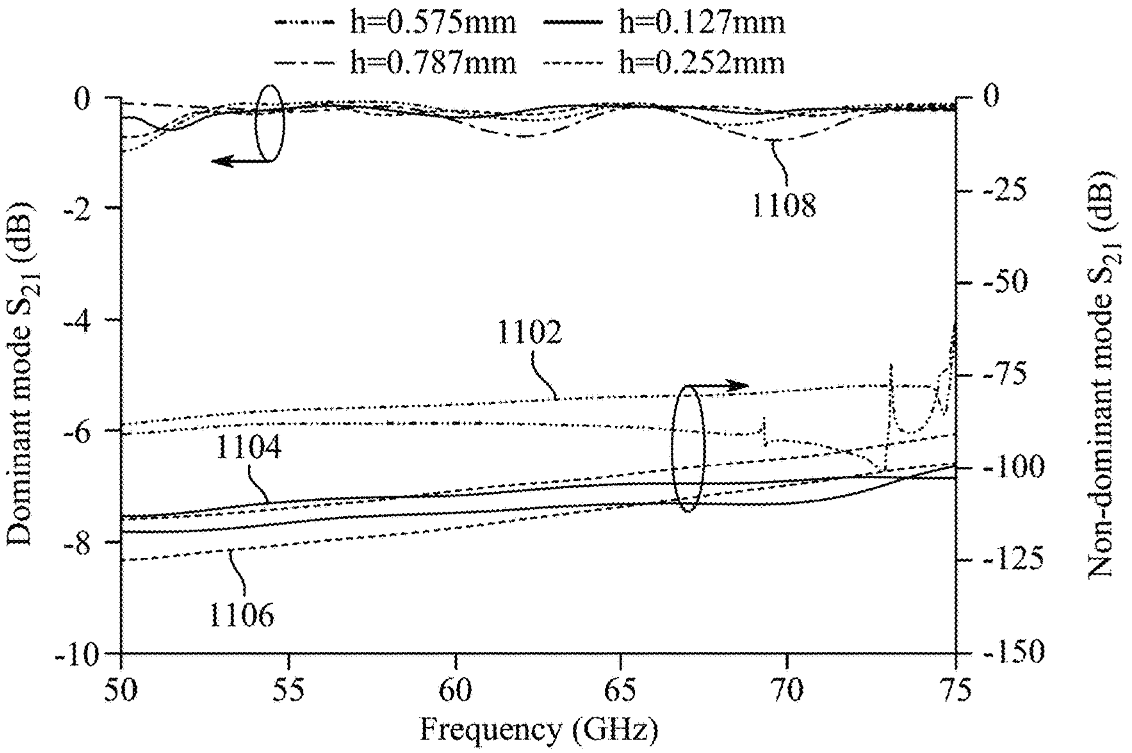
FIG. 11A displays simulated results of the modal purity of the S21 dominant mode and the S21 non-dominant mode versus frequency for a transition from WR-15 to SIW Rogers 5880, according to certain embodiments.
Figure 11B:
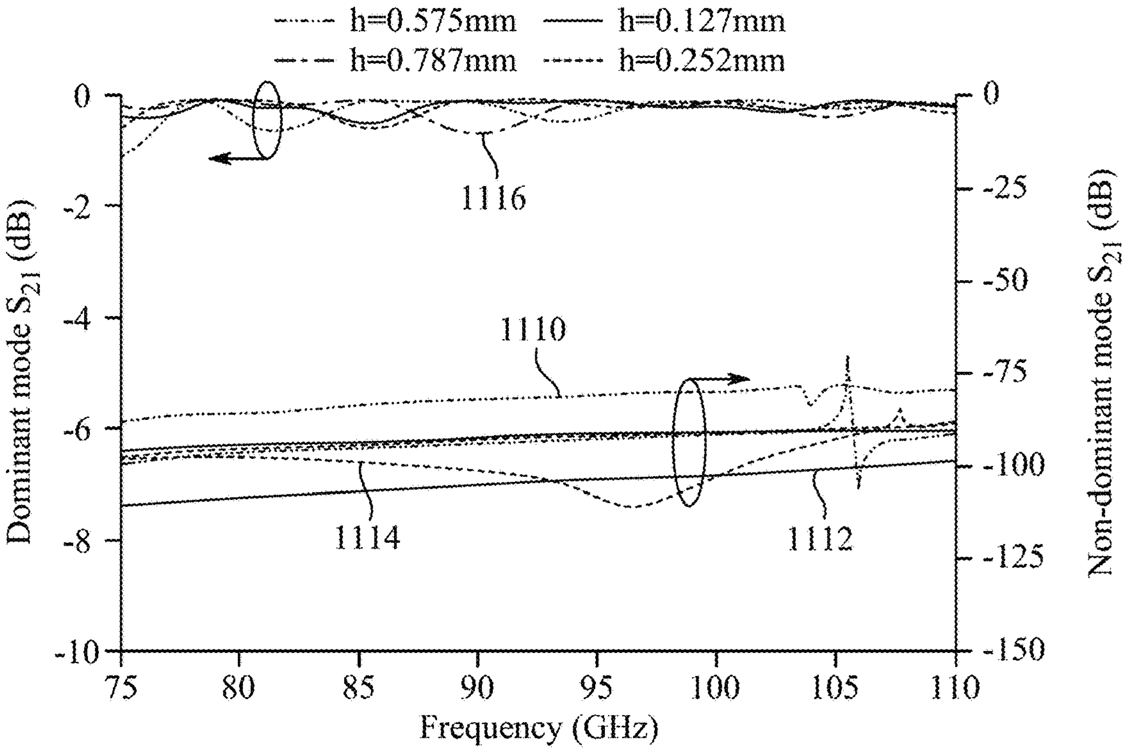
FIG. 11B displays the modal purity of the S21 dominant mode and the S21 non-dominant mode versus frequency for a transition from WR-10 to SIW Rogers 5880, according to certain embodiments.

FIG. 11A and FIG. 11B present the modal purity of the transmission systems, emphasizing the TE-10 dominant mode power levels relative to the non-dominant modes.

FIG. 11A displays simulated results of the modal purity of the transmission systems, in the case of transition of WR-15 to SIW [Rogers 5880]. Curve 1102 for h=0.575 mm, curve 1104 for h=0.252 mm, curve 1106 for h=0.127 mm, and curve 1108 for h=0.787 mm are plotted.

FIG. 11B displays the modal purity of the transmission systems, in the case of transition of WR-10 to SIW [Rogers 5880]. Curve 1110 for h=0.575 mm, curve 1112 for h=0.252 mm, curve 1114 for h=0.127 mm, and curve 1116 for h=0.787 mm are plotted.

Both graphs of FIG. 11A and FIG. 11B show that as substrate height varies, the modal purity for the TE-10 dominant mode is maintained with minimal fluctuation across the analyzed frequency ranges.

Figure 12A:
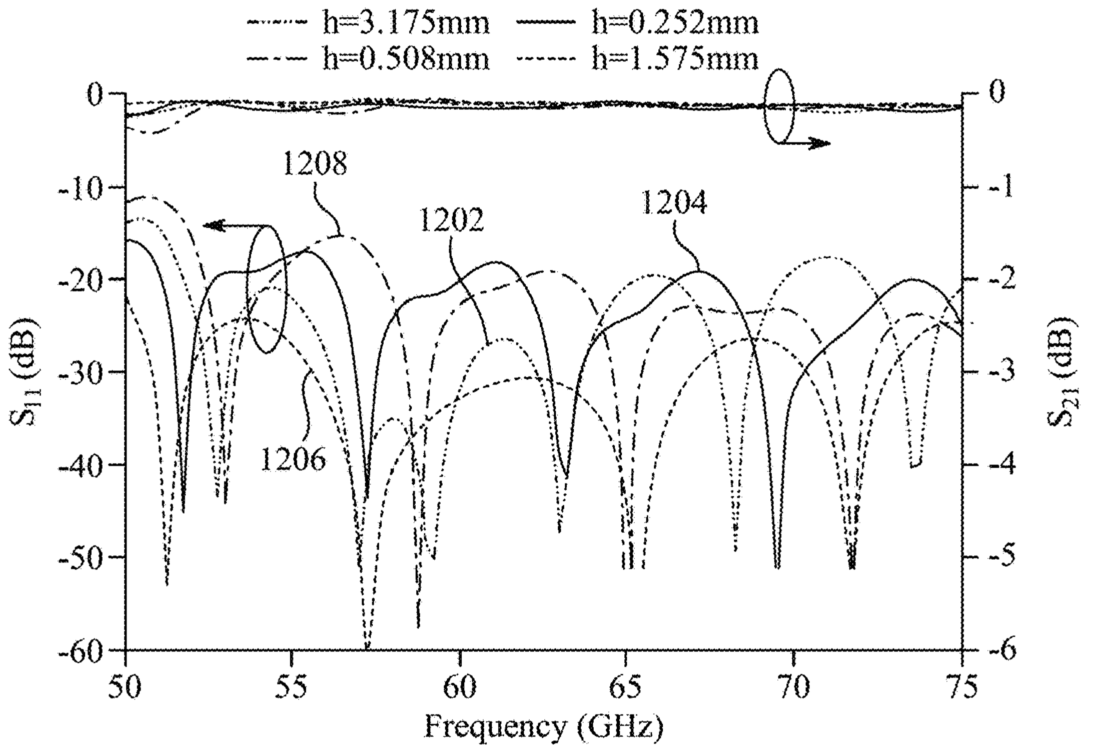
FIG. 12A displays simulated results for S11 and S21 versus frequency for a transition from WR-15 to AFSIW FR-4, according to certain embodiments.
Figure 12B:
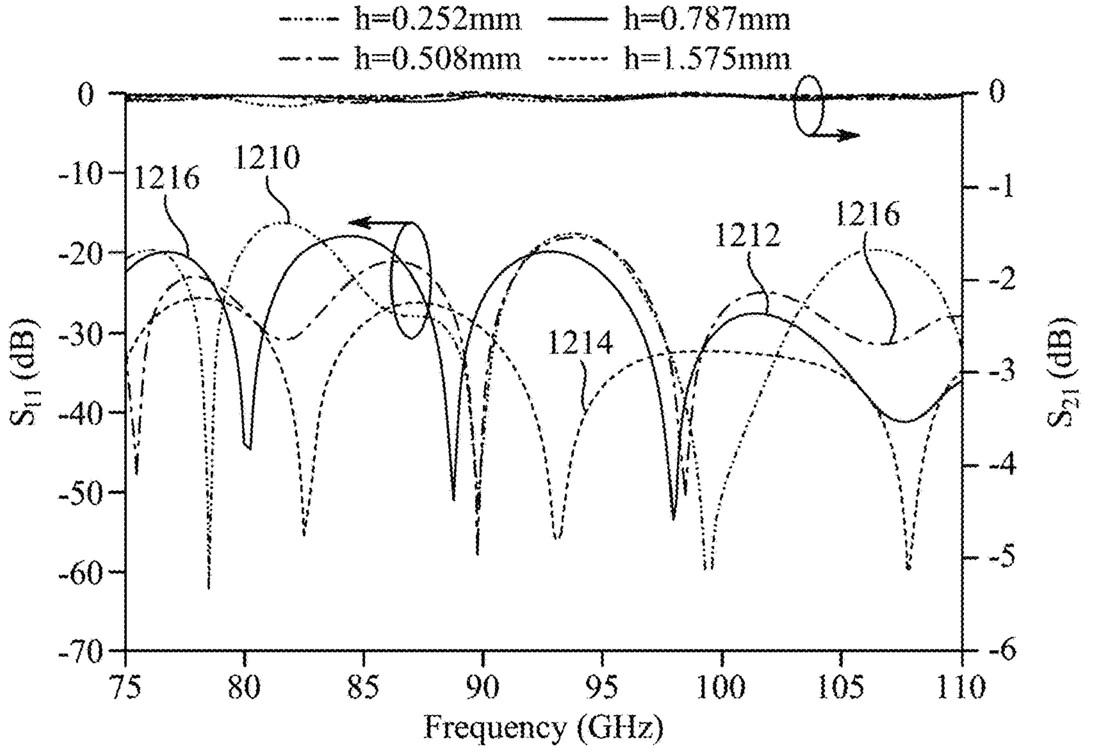
FIG. 12B displays the simulated results for S11 and S21 versus frequency for a transition from WR-10 to AFSIW Rogers 5880, according to certain embodiments.

FIG. 12A and FIG. 12B compares measured and simulated S-parameters, S11 and S21, versus frequency, for transmission with respect to different substrate heights, verifying the accuracy of the simulations against real-world measurements. FIG. 12A displays the simulated results, in the case of transition of WR-15 to AFSIW [FR-4]. Curve 1202 for h=0.575 mm, curve 1204 for h=0.252 mm, curve 1206 for h=0.127 mm, and curve 1208 for h=0.787 mm are plotted.

FIG. 12B displays the simulated results, in the case of transition of WR-10 to AFSIW [Rogers 5880]. Curve 1210 for h=0.575 mm, curve 1212 for h=0.252 mm, curve 1214 for h=0.127 mm, and curve 1216 for h=0.787 mm are plotted.

The graphs demonstrate a close match between measured and simulated $S_{11}$ values, indicating that the simulated model accurately reflects the physical behavior of the transmission system. The $S_{21}$ curves, which ideally should remain flat at 0 dB indicating no transmission loss, show that the system performs well within the desired specifications.

Figure 13A:
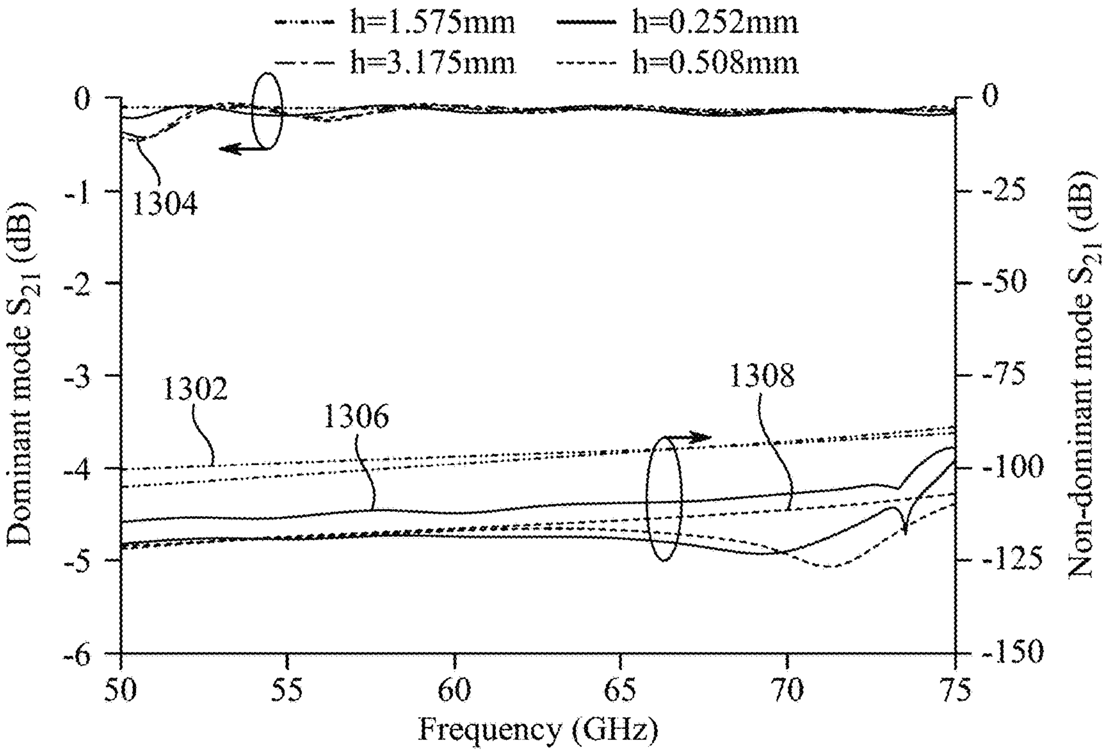
FIG. 13A displays modal purity of the S21 dominant mode for a transition from WR-15 to AFSIW FR-4, according to certain embodiments.

FIG. 13A displays the modal purity of the transmission systems when the transition is WR-15 to AFSIW [FR-4]. Curve 1302 for h=0.575 mm, curve 1304 for h=0.252 mm, curve 1306 for h=0.127 mm, and curve 1308 for h=0.787 mm are plotted.

Figure 13B:
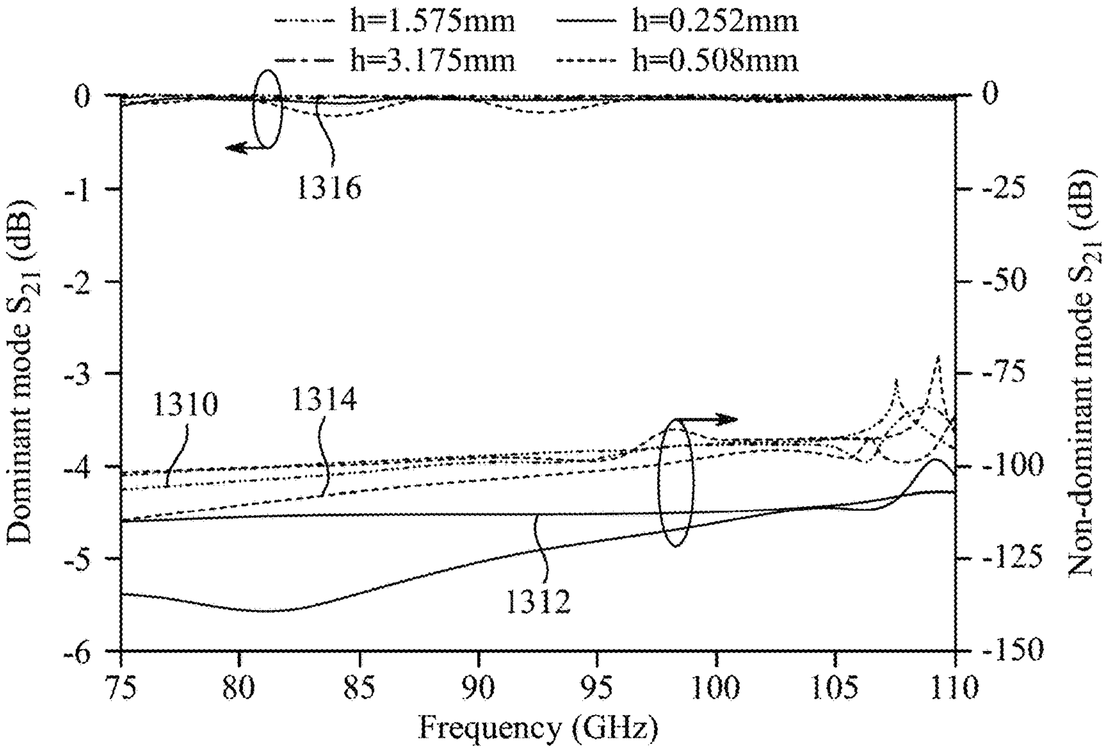
FIG. 13B displays the modal purity of the S21 dominant mode and the S21 non-dominant mode versus frequency for a transition from WR-10 to AFSIW Rogers 5880, according to certain embodiments.

FIG. 13B displays the modal purity of the transmission systems, when transition is WR-10 to AFSIW [Rogers 5880]. Curve 1310 for h=0.575 mm, curve 1312 for h=0.252 mm, curve 1314 for h=0.127 mm, and curve 1316 for h=0.787 mm are plotted.

Figure 14:
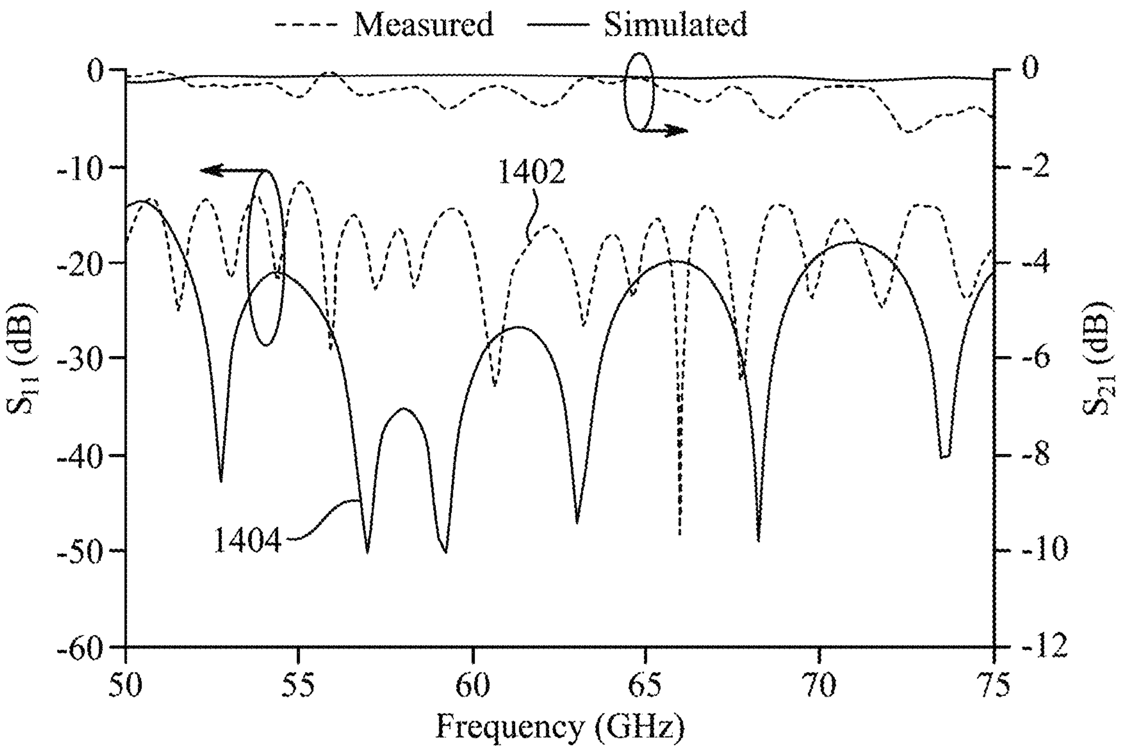
FIG. 14 displays a direct comparison between S11 and S21 measured and simulated S-parameters for the transition from RWG to AFSIW, according to certain embodiments.

FIG. 14 displays a direct comparison between measured and simulated S-parameters, offering a final validation of the simulation model's reliability and the transition design's effectiveness in minimizing insertion loss and preserving signal integrity across a specified frequency range. Curve 1402 presents measured S-parameters. Curve 1404 presents simulated S-parameters.

The apparatus for millimeter-wave transition thus facilitates the interconnection of RWG and SIW or AFSIW. The apparatus adopts a simplified design method with an analytically derived formula to determine the optimal transition length that minimizes VSWR, enhances mode purity, and reduces insertion loss for RWG to SIW or AFSIW connections.

As evidenced in FIG. 14, there is a significant correspondence between the measured and simulated S11 parameters and the insertion loss parameters. The S11 parameter is consistently maintained below −14.5 dB in measurements and −18.2 dB in simulations across the 50 to 75 GHz frequency range. The average measured insertion loss per transition is recorded at 0.48 dB, which is higher than the simulated result of 0.25 dB for the V-band. When incorporating FR-4 AFSIW, based on established techniques, the insertion loss is projected to be under 0.35 dB throughout the operational frequency spectrum.

Variations in the prototype measured performance are primarily due to surface roughness and misalignment issues, which are resolvable with high-precision manufacturing techniques. Comparative analyses have shown that the transition apparatus and method of design offers wider bandwidth and lower insertion loss relative to existing approaches documented in the literature. Table 2 summarizes the comparison between the various embodiments of the present disclosure with existing transitions techniques.

TABLE 2

Performance comparison of transition of the present disclosure with limited existing transition in V-band of operation

| Reference | Transition Structure | $S_{11}$ (dB) | Insertion Loss (dB) | % Relative Bandwidth (GHz)@ $S_{11}$ = −10 dB | Systematic Design Flow | Design Complexity |
|---|---|---|---|---|---|---|
| 1 | RWG-SIW | <−10 | <0.58 | 39.40% (50.5-75.3 GHz) | No | High |
| 2 | SIW-RWG | <−12 | <0.5 | 31.43% (48.8-67 GHz) | No | High |
| 3 | SIW-RWG | <−10 | <0.4 | 38.24% (44.2-65.1 GHz) | No | Moderate |
| 4 | SIW-RWG | <−10 | <0.58 | 26.22% (68.6-89.3 GHz) | No | High |
| 5 | SIW-RWG | <−10 | <0.5 | 40% (51.5-74.5 GHz) | No | High |
| 6 | RWG-AFSIW | <−25 | <0.11 | 31.6% (16-22 GHz) | No | High |
| Present Disclosure | RWG-AFSIW | <−10 | <0.35 | 40% (50-75 GHz) | Yes | Low |

1. Y. Li and K.-M. Luk, "A broadband V-band rectangular waveguide to substrate-integrated waveguide-transition," IEEE Microw. Wireless Compon. Lett., vol. 24, no. 9, pp. 590-592, 2014, incorporated herein by reference.
2. Mohamed and A. Sebak, "Broadband transition of substrate-integrated waveguide-to-air-filled rectangular waveguide, "IEEE Microw. Wireless Compon. Lett., vol. 28, no. 11, pp. 966-968, 2018, incorporated herein by reference.
3. B. Wang and H. Wong, "Broadband substrate integrated waveguide to rectangular waveguide transition at V-band," in Proc. IEEE Asia-Pacific Microw. Conf. (APMC), 2020, pp. 788-789, incorporated herein by reference.
4. O. A. Shcherbyna and Y. Yashchyshyn, "Broadband V-band angular transition," Radioelectronics Commun. Syst., vol. 59, no. 4, pp. 179-183, April 2016, incorporated herein by reference.
5. S. Hansen and N. Pohl, "A W-band stepped impedance transformer transition from SIW to RWG for thin single layer substrates with thick metal cladding," in Proc. 49th Eur. Microw. Conf. (EuMC), 2019, pp. 352-355, incorporated herein by reference.
6. J. W. Digby, C. E. McIntosh, G. M. Parkhurst, B. M. Towlson, S. Hadjiloucas, J. W. Bowen, J. M. Chamberlain, R. D. Pollard, R. E. Miles, D. P. Steenson, L. S. Karatzas, N. J. Cronin, and S. R. Davies, "Fabrication and characterization of micromachined rectangular waveguide components for use at millimeter-waveand terahertz frequencies," IEEE Trans. Microw. Theory Techn., vol. 48, no. 8, pp. 1293-1302, 2000, incorporated herein by reference.

The performance of the transition, including $S_{11}$ and insertion loss, was affirmed through experimental measurements within the 50-75 GHz frequency range. Such comprehensive analysis indicates that the apparatus and methods of the present disclosure are conducive to the development of economical and high-data-rate communication systems.

Embodiments of the present disclosure are illustrated with respect to FIG. 1A to FIG. 14. In a first embodiment, a millimeter wave transition apparatus for interconnecting a rectangular waveguide (RWG) and a substrate integrated waveguide (SIW) includes a first rectangular waveguide (RWG) and a second RWG, a substrate integrated waveguide (SIW), a first hollow metallic structure having a rectangular first end configured to connect to an exit aperture of the first RWG and a rectangular second end configured to connect with an entrance aperture of the SIW, wherein the first hollow metallic structure comprises a tapered body which extends from the rectangular first end to the rectangular second end, and a second hollow metallic structure having a rectangular first end configured to connect with an entrance aperture of the second RWG and a rectangular second end configured to connect to an exit aperture of the SIW, wherein the second hollow metallic structure comprises a tapered body which extends from the rectangular first end to the rectangular second end, wherein the tapered body of each hollow metallic structure has a transition length between its rectangular first end and its rectangular second end of about 1 mm to about 15 mm for an SIW aperture height in the range of about 0.2 mm to about 1.0 mm, has an impedance in a range of about 350 ohms to about 400 ohms at its rectangular first end, at which an impedance of the hollow metallic structure matches an impedance of the SIW aperture, has a voltage standing wave ratio in the range of about 1 to about 5 for transition lengths of about 3 mm to about 20 mm and for SIW substrate heights of about 0.127 mm to about 0.787 mm, has a total reflection coefficient in the range of about −20 dB to about −10 dB and has modal purity in a range of about −1 dB to about 0.25 dB in a dominant mode and about −125 dB to about −75 dB in a non-dominant mode during a transmission of a millimeter wave having a frequency λ in the range of about 50 GHz to about 75 GHz through the transition apparatus.

In one aspect of the embodiment, the rectangular first end of the first hollow metallic structure has a width $a_0$ and a height $b_0$, the rectangular second end of the first hollow metallic structure has a width $a_1$ and a height $b_1$, and the tapered body of the first hollow metallic structure is designed to taper out when either $a_0<a_1$ or $b_0<b_1$.

In one aspect of the embodiment, the rectangular first end of the first hollow metallic structure has a width $a_0$ and a height $b_0$, the rectangular second end of the first hollow metallic structure has a width $a_1$ and a height $b_1$, and the tapered body of the first hollow metallic structure is designed to taper in when either $a_0>a_1$ or $b_0>b_1$.

In one aspect of the embodiment, the rectangular first end of the second hollow metallic structure has a width $a_1$ and a height $b_1$, the rectangular second end of the second hollow metallic structure has a width $a_0$ and a height $b_0$, and the tapered body of the second hollow metallic structure is designed to taper in when either $a_0<a_1$ or $b_0<b_1$.

In one aspect of the embodiment, the rectangular first end of the second hollow metallic structure has a width $a_1$ and a height $b_1$, the rectangular second end of the second hollow metallic structure has a width $a_0$ and a height $b_0$, and the tapered body of the second hollow metallic structure is designed to taper out when either $a_0>a_1$ or $b_0>b_1$.

In one aspect of the embodiment, the SIW aperture includes a printed circuit board that extends into the rectangular second end of the first hollow metallic structure, the rectangular first end of the first hollow metallic structure has a width $a_0$ and a height $b_0$, the rectangular second end of the first hollow metallic structure has a width $a_1$ and a height $b_1$, where the tapered body of the first hollow metallic structure is designed to taper out when either $a_0<a_1$ or $b_0<b_1$, and the tapered body of the first hollow metallic structure is designed to taper in when either $a_0>a_1$ or $b_0>b_1$.

In one aspect of the embodiment, a length $L_{SIW}$ of the tapered body of the first hollow metallic structure between the rectangular first end and the rectangular second end is given by:

$$L_{SIW} \cong 0.35\sqrt{K_0^2\lambda^2 + K_1^2\lambda^2}, \text{ where}$$

$$K_0 = \frac{\frac{(b_1-b_0)}{b_0} - \frac{a_1-a_0}{a_0}\left(\frac{\epsilon_{eff}}{\epsilon_{eff}-\left(\frac{\lambda_0}{2a_0}\right)^2}\right)}{\left(\epsilon_{eff}-\left(\frac{\lambda_0}{2a_0}\right)^2\right)^{\frac{1}{2}}}; \text{ and}$$

$$K_1 = \frac{\frac{(b_1-b_0)}{b_1} - \frac{a_1-a_0}{a_1}\left(\frac{\epsilon_{eff}}{\epsilon_{eff}-\left(\frac{\lambda_0}{2a_1}\right)^2}\right)}{\left(\epsilon_{eff}-\left(\frac{\lambda_0}{2a_1}\right)^2\right)^{\frac{1}{2}}}$$

where λ is a frequency of the millimeter wave transmitted through the transition apparatus, $\lambda_0$ is a resonant frequency of the first RWG and $\varepsilon_{eff}$ is an effective dielectric constant of the SIW.

In one aspect of the embodiment, the total reflection coefficient $\Gamma_T$ of the first hollow metallic structure when connected between the first RWG and the SIW is given by:

$$\Gamma_T = \frac{1}{4\gamma_0}\left(\frac{d}{dx}\ln Z_0\right) - \frac{1}{4\gamma_2}\left(\frac{d}{dx}\ln Z_2\right)\exp\left(-2\int_0^{L_1}\gamma_T dx\right) + \Gamma_A$$

where $\gamma_0$ is a propagation constant of the first RWG, $\gamma_1$ is the propagation constant of the SIW, $\gamma_T$ is the propagation constant of the first hollow metallic structure, $Z_0$ is an impedance of the first RWG, $Z_2$ is an impedance of the SIW and $\Gamma_A$ is added to account for reflections from within the SIW.

In one aspect of the embodiment, a length $L_{SIW}$ of the tapered body of the second hollow metallic structure between the rectangular first end and the rectangular second end is given by:

$$L_{SIW} \cong 0.35\sqrt{K_0^2\lambda^2 + K_1^2\lambda^2}, \text{ where}$$

$$K_0 = \frac{\frac{(b_1-b_0)}{b_0} - \frac{a_1-a_0}{a_0}\left(\frac{\epsilon_{eff}}{\epsilon_{eff}-\left(\frac{\lambda_0}{2a_0}\right)^2}\right)}{\left(\epsilon_{eff}-\left(\frac{\lambda_0}{2a_0}\right)^2\right)^{\frac{1}{2}}}; \text{ and}$$

$$K_1 = \frac{\frac{(b_1-b_0)}{b_1} - \frac{a_1-a_0}{a_1}\left(\frac{\epsilon_{eff}}{\epsilon_{eff}-\left(\frac{\lambda_0}{2a_1}\right)^2}\right)}{\left(\epsilon_{eff}-\left(\frac{\lambda_0}{2a_1}\right)^2\right)^{\frac{1}{2}}}$$

where λ is a frequency of the millimeter wave transmitted through the transition apparatus, $\lambda_0$ is a resonant frequency of the second RWG and $\varepsilon_{eff}$ is an effective dielectric constant of the SIW.

In one aspect of the embodiment, the SIW is an air-filled SIW (AFSIW), the rectangular first end of the second hollow metallic structure has a width $a_1$ and a height $b_1$, the rectangular second end of the second hollow metallic structure has a width $a_0$ and a height $b_0$. The tapered body of the second hollow metallic structure is designed to taper out when either $a_1<a_0$ or $b_1<b_0$, and the tapered body of the second hollow metallic structure is designed to taper in when either $a_0>a_1$ or $b_0>b_1$.

In one aspect of the embodiment, a length $L_{AFSIW}$ of the tapered body of the second hollow metallic structure between the first end and the second end is given by:

$$L_{AFSIW} \cong 0.35\sqrt{K_0^2\lambda^2 + K_1^2\lambda^2}\text{, where}$$

$$K_0 = \frac{\dfrac{(b_1-b_0)}{b_0} - \dfrac{a_1-a_0}{a_0}\left(\dfrac{\epsilon_{eff}}{\epsilon_{eff}-\left(\dfrac{\lambda_0}{2a_0}\right)^2}\right)}{\left(\epsilon_{eff}-\left(\dfrac{\lambda_0}{2a_0}\right)^2\right)^{\frac{1}{2}}}\text{; and}$$

$$K_1 = \frac{\dfrac{(b_1-b_0)}{b_1} - \dfrac{a_1-a_0}{a_1}\left(\dfrac{\epsilon_{eff}}{\epsilon_{eff}-\left(\dfrac{\lambda_0}{2a_1}\right)^2}\right)}{\left(\epsilon_{eff}-\left(\dfrac{\lambda_0}{2a_1}\right)^2\right)^{\frac{1}{2}}};$$

where $\lambda$ is a frequency of the millimeter wave transmitted through the transition apparatus, $\lambda_0$ is a resonant frequency of the second RWG and $\varepsilon_{eff}$ is an effective dielectric constant of the AFSIW.

In one aspect of the embodiment, the total reflection coefficient $\Gamma_T$ of the second hollow metallic structure when connected between the AFSIW and the second RWG is given by:

$$|\Gamma_{AFSIW}| = \frac{1}{\frac{L_1}{\lambda_0}}\sqrt{\left(\frac{K_0^2+K_1^2}{64\pi^2}\right)-\left(\frac{K_0K_1}{32\pi^2}\right)\cos(4\pi l)} + \Gamma_A,$$

where $$\Gamma_A = \frac{a_1\sqrt{4-\dfrac{\lambda_0^2}{a_1^2}}\left(W^3\sqrt{\varepsilon_r}+2w_1^3\right) - 2\left(W^2+2w_1^2\right)^2\sqrt{\varepsilon_r}\sqrt{1-\dfrac{0.0625\lambda_0^2}{(W-1.25w_1)^2}}}{2\left(W^2+2w_1^2\right)^2\sqrt{\varepsilon_r}\sqrt{1-\dfrac{0.0625\lambda_0^2}{(W-1.25w_1)^2}} + a_1\sqrt{4-\dfrac{\lambda_0^2}{a_1^2}}\left(W^3\sqrt{\varepsilon_r}+2w_1^3\right)};$$

and $$l = \frac{L_1}{\lambda_0}\left\{1-\frac{1}{8}\left(\frac{\lambda_0}{a_1-a_0}\right)\left[\left(\frac{\lambda_0}{a_0}\right)-\left(\frac{\lambda_0}{a_1}\right)\right]\right\},$$

where $L_1=L_{AFSIW}$, $\gamma_0$ is a propagation constant of the second RWG, $\gamma_1$ is a propagation constant of the AFSIW, $\gamma_T$ is a propagation constant of the first hollow metallic structure, $Z_0$ is an impedance of the second RWG, W is a width of an air-filled region of the AFSIW, $w_1$ is a width of a dielectric filled region of the AFSIW, and $\varepsilon_r$ is a dielectric constant of the second hollow metallic structure.

In one aspect of the embodiment, the hollow metallic structure is aluminum.

In another exemplary embodiment, a method for making a low-loss millimeter wave transition structure for interconnecting a rectangular waveguide (RWG) and a substrate integrated waveguide (SIW) is described. The method includes obtaining a characteristic impedance $Z_0$ of the RWG and a characteristic impedance $Z_2$ of the SIW, obtaining a width $a_0$ and a height $b_0$ of the RWG, obtaining a width $a_1$ and a height $b_1$ of the SIW, obtaining a resonant frequency $\lambda_0$ of the RWG and an effective dielectric constant $\varepsilon_{eff}$ of the SIW, calculating, by a computing device including a memory storing program instruction and at least one processor configured to execute the program instructions, the shortest length $L_{SIW}$ of the transition structure which matches the impedance of the SIW aperture. The shortest length is in the range of about 1 mm to about 15 mm for a SIW aperture height in the range of about 0.2 mm to about 1.0 mm, has a voltage standing wave ratio in the range of about 1 to about 5 for transition lengths of about 3 mm to about 20 mm and for SIW substrate heights of about 0.127 mm to about 0.787 mm, has a total reflection coefficient $\Gamma_T$ in the range of about −20 dB to about −10 dB and has modal purity in a range of about −1 dB to about 0.25 dB in a dominant mode and about −125 dB to about −75 dB in a non-dominant mode during a transmission of a millimeter wave having a frequency $\lambda$ in the range of about 50 GHz to about 75 GHz through the transition apparatus, and fabricating, by CNC micromachining, the transition structure.

In an aspect of the embodiment, the method includes tapering the transition structure out from an aperture of a first RWG to an entrance aperture of the SIW when either $a_0<a_1$ or $b_0<b_1$, tapering the transition structure in from the aperture of the first RWG to the entrance aperture of the SIW when either $a_0>a_1$ or $b_0>b_1$, tapering the transition structure out from an exit aperture of the SIW to an aperture of a second RWG when either $a_0<a_1$ or $b_0<b_1$, and tapering the transition structure in from the exit aperture of the SIW to the aperture of the second RWG when either $a_0>a_1$ or $b_0>b_1$.

In an aspect of the embodiment, the method includes impedance matching the transition structure to the SIW by extending a portion of a printed circuit board of the SIW into the transition structure.

In an aspect of the embodiment, the method includes calculating, by the computing device, the shortest length $L_{SIW}$ of the transition structure based on:

$$L_{SIW} \cong 0.35\sqrt{K_0^2\lambda^2 + K_1^2\lambda^2}\text{, where}$$

$$K_0 = \frac{\dfrac{(b_1-b_0)}{b_0} - \dfrac{a_1-a_0}{a_0}\left(\dfrac{\epsilon_{eff}}{\epsilon_{eff}-\left(\dfrac{\lambda_0}{2a_0}\right)^2}\right)}{\left(\epsilon_{eff}-\left(\dfrac{\lambda_0}{2a_0}\right)^2\right)^{\frac{1}{2}}}\text{; and}$$

$$K_1 = \frac{\dfrac{(b_1-b_0)}{b_1} - \dfrac{a_1-a_0}{a_1}\left(\dfrac{\epsilon_{eff}}{\epsilon_{eff}-\left(\dfrac{\lambda_0}{2a_1}\right)^2}\right)}{\left(\epsilon_{eff}-\left(\dfrac{\lambda_0}{2a_1}\right)^2\right)^{\frac{1}{2}}};$$

where $\lambda$ is a frequency of the millimeter wave transmitted through the transition apparatus, $\lambda_0$ is a resonant frequency of the first RWG and $\varepsilon_{eff}$ is an effective dielectric constant of the SIW.

In an aspect of the embodiment, the method includes calculating, by the computing device, the total reflection coefficient $\Gamma_T$ of the transition structure by:

$$\Gamma_T = \frac{1}{4\gamma_0}\left(\frac{d}{dx}\ln Z_0\right) - \frac{1}{4\gamma_2}\left(\frac{d}{dx}\ln Z_2\right)$$

-continued $$\exp\left(-2\int_0^{L_1}\gamma_T dx\right)+\Gamma_A$$

where $\gamma_0$ is a propagation constant of the first RWG, $\gamma_1$ is a propagation constant of the SIW, $\gamma_T$ is a propagation constant of the first hollow metallic structure, and $\Gamma_A$ is added to account for reflections from within the SIW.

In an aspect of the embodiment, the method includes forming an air-filled SIW (AFSIW) by removing a portion of a dielectric of the SIW, calculating, by the computing device, the shortest length $L_{AFSIW}$ of the transition structure based on:

$$L_{AFSIW} \cong 0.35\sqrt{K_0^2\lambda^2+K_1^2\lambda^2}\text{, where}$$

$$K_0=\frac{\frac{(b_1-b_0)}{b_0}-\frac{a_1-a_0}{a_0}\left(\frac{\epsilon_{eff}}{\epsilon_{eff}-\left(\frac{\lambda_0}{2a_0}\right)^2}\right)}{\left(\epsilon_{eff}-\left(\frac{\lambda_0}{2a_0}\right)^2\right)^{\frac{1}{2}}}\text{; and}$$

$$K_1=\frac{\frac{(b_1-b_0)}{b_1}-\frac{a_1-a_0}{a_1}\left(\frac{\epsilon_{eff}}{\epsilon_{eff}-\left(\frac{\lambda_0}{2a_1}\right)^2}\right)}{\left(\epsilon_{eff}-\left(\frac{\lambda_0}{2a_1}\right)^2\right)^{\frac{1}{2}}};$$

where $\lambda$ is a resonant frequency of the RWG and $\varepsilon_{eff}$ is an effective dielectric constant of the AFSIW.

In an aspect of the embodiment, the total reflection coefficient $\Gamma_T$ of the second hollow metallic structure when connected between the AFSIW and the second RWG is given by:

$$|\Gamma_{AFSIW}|=\frac{1}{\frac{L_1}{\lambda_0}}\sqrt{\left(\frac{K_0^2+K_1^2}{64\pi^2}\right)-\left(\frac{K_0K_1}{32\pi^2}\right)\cos(4\pi l)}+\Gamma_A$$

where $$\Gamma_A=\frac{a_1\sqrt{4-\frac{\lambda_0^2}{a_1^2}}\left(W^3\sqrt{\varepsilon_r}+2w_1^3\right)-2\left(W^2+2w_1^2\right)^2\sqrt{\varepsilon_r}\sqrt{1-\frac{0.0625\lambda_0^2}{(W-1.25w_1)^2}}}{2\left(W^2+2w_1^2\right)^2\sqrt{\varepsilon_r}\sqrt{1-\frac{0.0625\lambda_0^2}{(W-1.25w_1)^2}}+a_1\sqrt{4-\frac{\lambda_0^2}{a_1^2}}\left(W^3\sqrt{\varepsilon_r}+2w_1^3\right)};$$

and $$l=\frac{L_1}{\lambda_0}\left\{1-\frac{1}{8}\left(\frac{\lambda_0}{a_1-a_0}\right)\left[\left(\frac{\lambda_0}{a_0}\right)-\left(\frac{\lambda_0}{a_1}\right)\right]\right\}$$

where $L_1=L_{AFSIW}$, $\gamma_0$ is a propagation constant of the second RWG, $\gamma_1$ is a propagation constant of the AFSIW, $\gamma_T$ is a propagation constant of the transition structure, $Z_0$ is an impedance of the second RWG, W is a width of an air-filled region of the AFSIW, $w_1$ is a width of a dielectric filled region of the AFSIW, and $\varepsilon_r$ is a dielectric constant of the transition.

Figure 15:
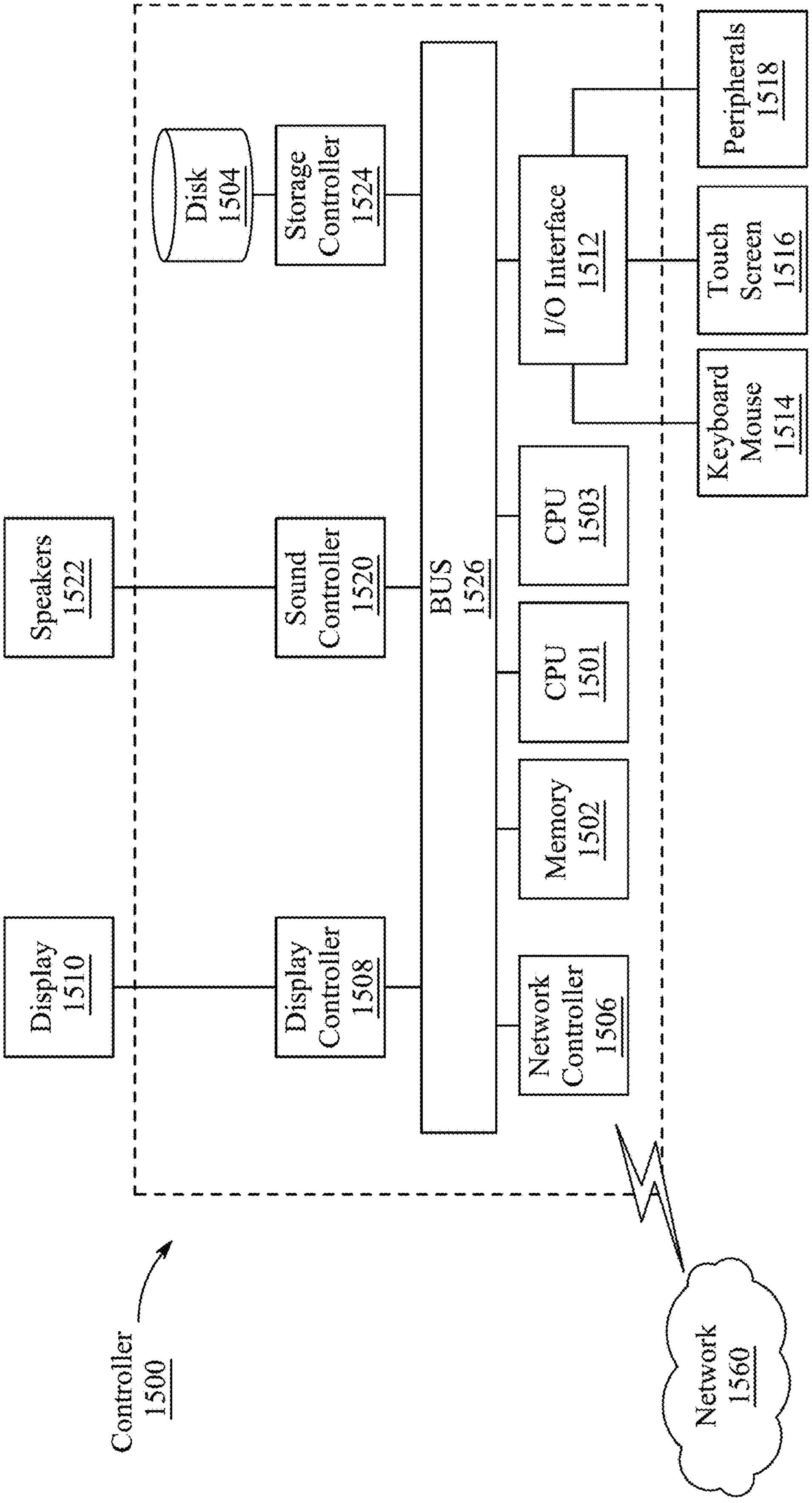
FIG. 15 is an illustration of a non-limiting example of details of computing hardware used in the computing system, according to certain embodiments.

Next, further details of the hardware description of the computing environment according to exemplary embodiments is described with reference to FIG. 15. In FIG. 15, a controller 1500 is described is representative of a computing system models and simulates the transition to generate the graphs of FIG. 2A to FIG. 7, performs the process of FIG. 8 and generates the graphs shown in FIG. 10A to FIG. 14. The controller 1500 is a computing device which includes a CPU 1501 which performs the processes described above/below. The process data and instructions may be stored in memory 1502. These processes and instructions may also be stored on a storage medium disk 1504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1501, 1503 and an operating system such as Microsoft Windows 9, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1501 or CPU 1503 may be a Xenon or Core processor from Intel of America or an Opteron processor from AMD of America, or may be other processor types that would be recognized by one of ordinary skill in the art. Alternatively, the CPU 1501, 1503 may be implemented on an FPGA, ASIC, PLD or using discrete logic circuits, as one of ordinary skill in the art would recognize. Further, CPU 1501, 1503 may be implemented as multiple processors cooperatively working in parallel to perform the instructions of the inventive processes described above.

The computing device in FIG. 15 also includes a network controller 1506, such as an Intel Ethernet PRO network interface card from Intel Corporation of America, for interfacing with network 1560. As can be appreciated, the network 1560 can be a public network, such as the Internet, or a private network such as an LAN or WAN network, or any combination thereof and can also include PSTN or ISDN sub-networks. The network 1560 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1508, such as a NVIDIA Geforce GTX or Quadro graphics adaptor from NVIDIA Corporation of America for interfacing with display 1510, such as a Hewlett Packard HPL2445w LCD monitor. A general purpose I/O interface 1512 interfaces with a keyboard and/or mouse 1514 as well as a touch screen panel 1516 on or separate from display 1510. General purpose I/O interface also connects to a variety of peripherals 1518 including printers and scanners, such as an OfficeJet or DeskJet from Hewlett Packard.

A sound controller 1520 is also provided in the computing device such as Sound Blaster X-Fi Titanium from Creative, to interface with speakers/microphone 1522 thereby providing sounds and/or music.

The general purpose storage controller 1524 connects the storage medium disk 1504 with communication bus 1526, which may be an ISA, EISA, VESA, PCI, or similar, for interconnecting all of the components of the computing device. A description of the general features and functionality of the display 1510, keyboard and/or mouse 1514, as well as the display controller 1508, storage controller 1524, network controller 1506, sound controller 1520, and general purpose I/O interface 1512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 16.

Figure 16:
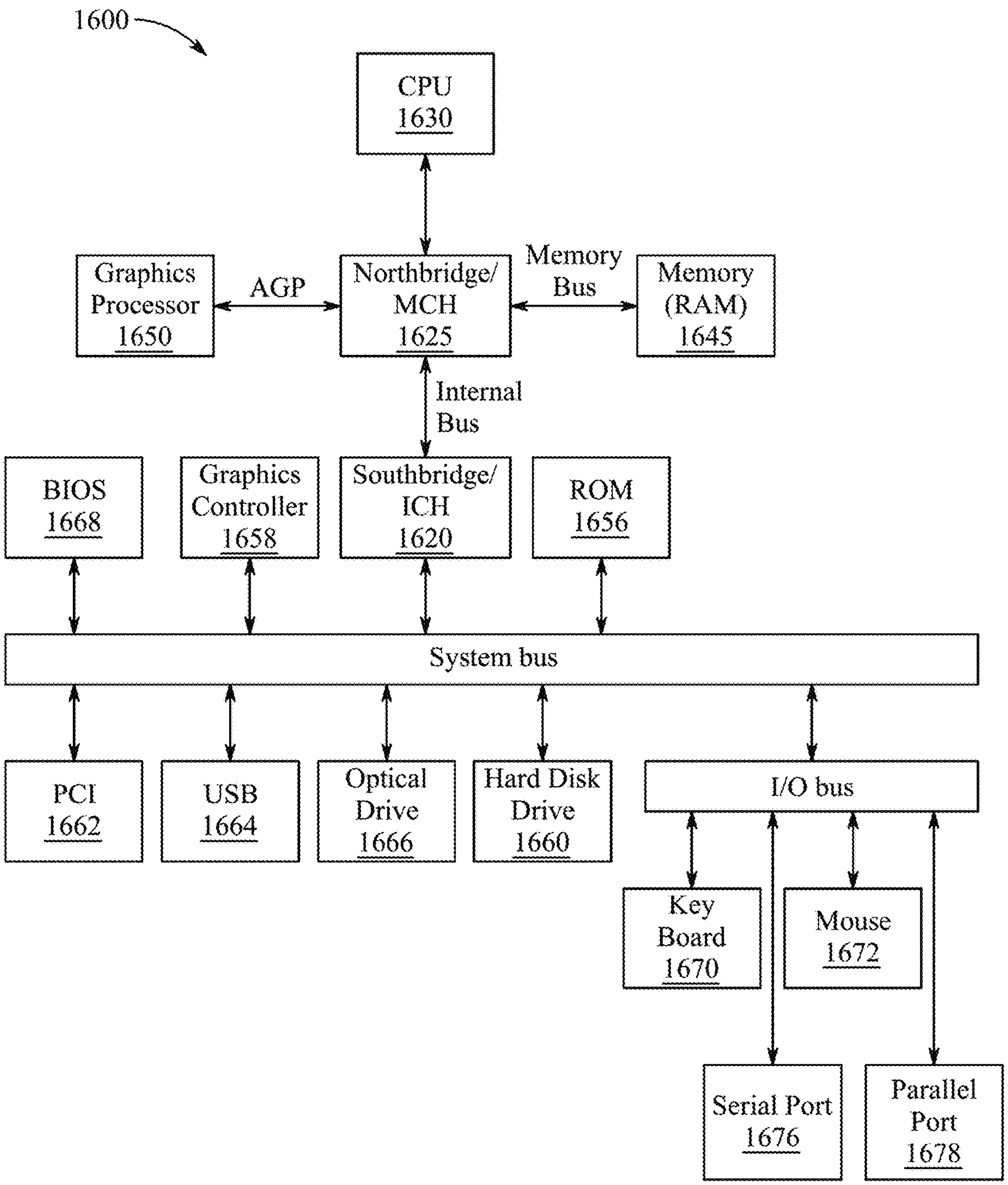
FIG. 16 is an exemplary schematic diagram of a data processing system used within the computing system, according to certain embodiments.

FIG. 16 shows a schematic diagram of a data processing system 1600, according to certain aspects of the present disclosure, for performing the functions of the exemplary aspects. The data processing system 1600 is an example of a computer in which code or instructions implementing the processes of the illustrative aspects may be located.

In FIG. 16, data processing system 1600 employs a hub architecture including a north bridge and memory controller hub (NB/MCH) 1625 and a south bridge and input/output (I/O) controller hub (SB/ICH) 1620. The central processing unit (CPU) 1630 is connected to NB/MCH 1625. The NB/MCH 1625 also connects to the memory 1645 via a memory bus, and connects to the graphics processor 1650 via an accelerated graphics port (AGP). The NB/MCH 1625 also connects to the SB/ICH 1620 via an internal bus (e.g., a unified media interface or a direct media interface). The CPU Processing unit 1630 may contain one or more processors and even may be implemented using one or more heterogeneous processor systems.

Figure 17:
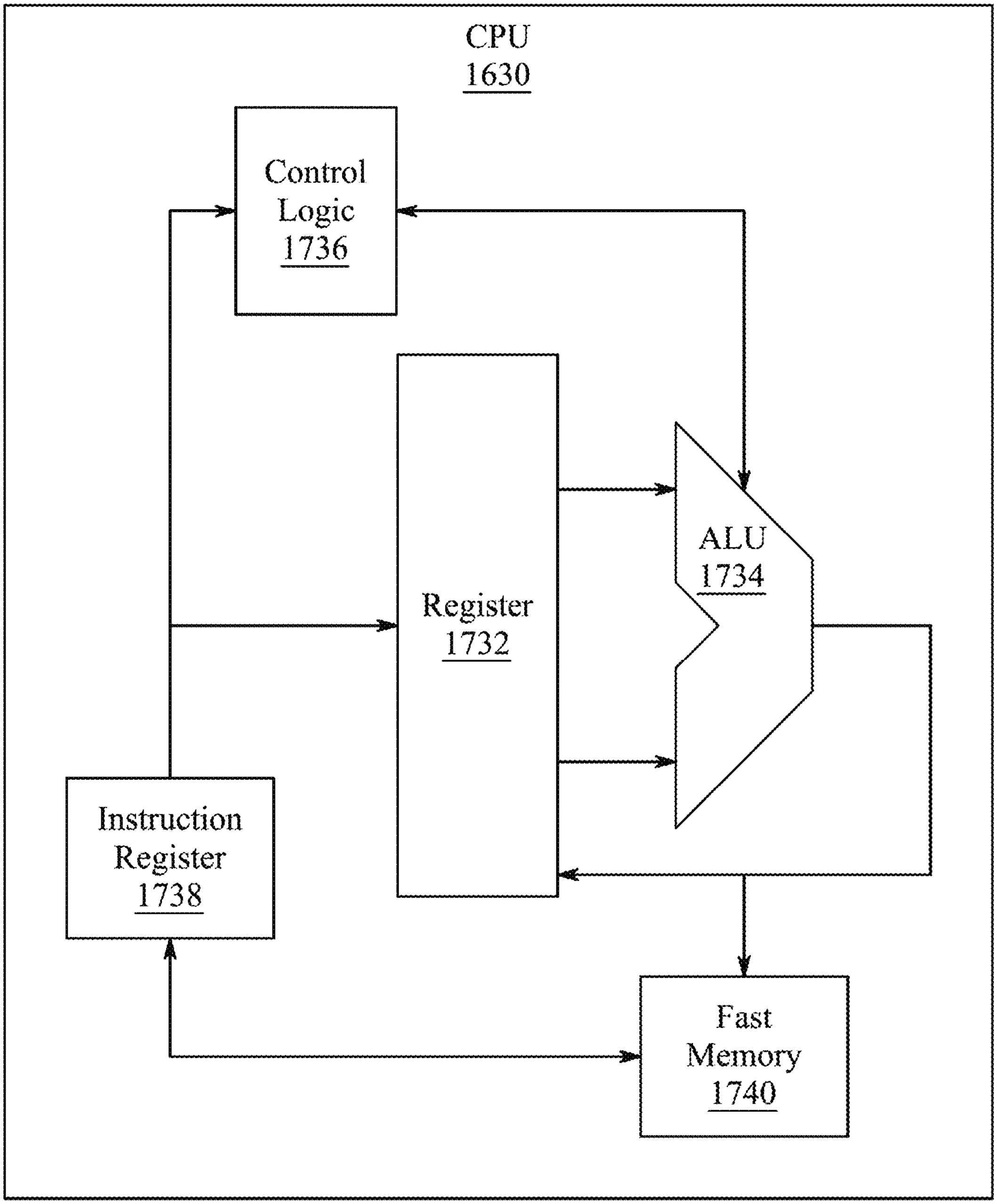
FIG. 17 is an exemplary schematic diagram of a processor used with the computing system, according to certain embodiments.

For example, FIG. 17 shows one implementation of CPU 1630, according to an aspect of the present disclosure. In one implementation, the instruction register 1738 retrieves instructions from the fast memory 1740. At least part of these instructions are fetched from the instruction register 1738 by the control logic 1736 and interpreted according to the instruction set architecture of the CPU 1630. Part of the instructions can also be directed to the register 1732. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1734 that loads values from the register 1732 and performs logical and mathematical operations on the loaded values according to the instructions. The results from these operations can be feedback into the register and/or stored in the fast memory 1740. According to certain implementations, the instruction set architecture of the CPU 1630 can use a reduced instruction set architecture, a complex instruction set architecture, a vector processor architecture, a very large instruction word architecture. Furthermore, the CPU 1630 can be based on the Von Neuman model or the Harvard model. The CPU 1630 can be a digital signal processor, an FPGA, an ASIC, a PLA, a PLD, or a CPLD. Further, the CPU 1630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 16, the data processing system 1600 can include that the SB/ICH 1620 is coupled through a system bus to an I/O Bus, a read only memory (ROM) 1656, universal serial bus (USB) port 1664, a flash binary input/output system (BIOS) 1668, and a graphics controller 1658. PCI/PCIe devices can also be coupled to SB/ICH 888 through a PCI bus 1662.

The PCI devices may include, for example, Ethernet adapters, add-in cards, and PC cards for notebook computers. The Hard disk drive 1660 and CD-ROM 1666 can use, for example, an integrated drive electronics (IDE) or serial advanced technology attachment (SATA) interface. In one implementation the I/O bus can include a super I/O (SIO) device.

Further, the hard disk drive (HDD) 1660 and optical drive 1666 can also be coupled to the SB/ICH 1620 through a system bus. In one implementation, a keyboard 1670, a mouse 1672, a parallel port 1678, and a serial port 1676 can be connected to the system bus through the I/O bus. Other peripherals and devices that can be connected to the SB/ICH 1620 using a mass storage controller such as SATA or PATA, an Ethernet port, an ISA bus, a LPC bridge, SMBus, a DMA controller, and an Audio Codec.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 18:
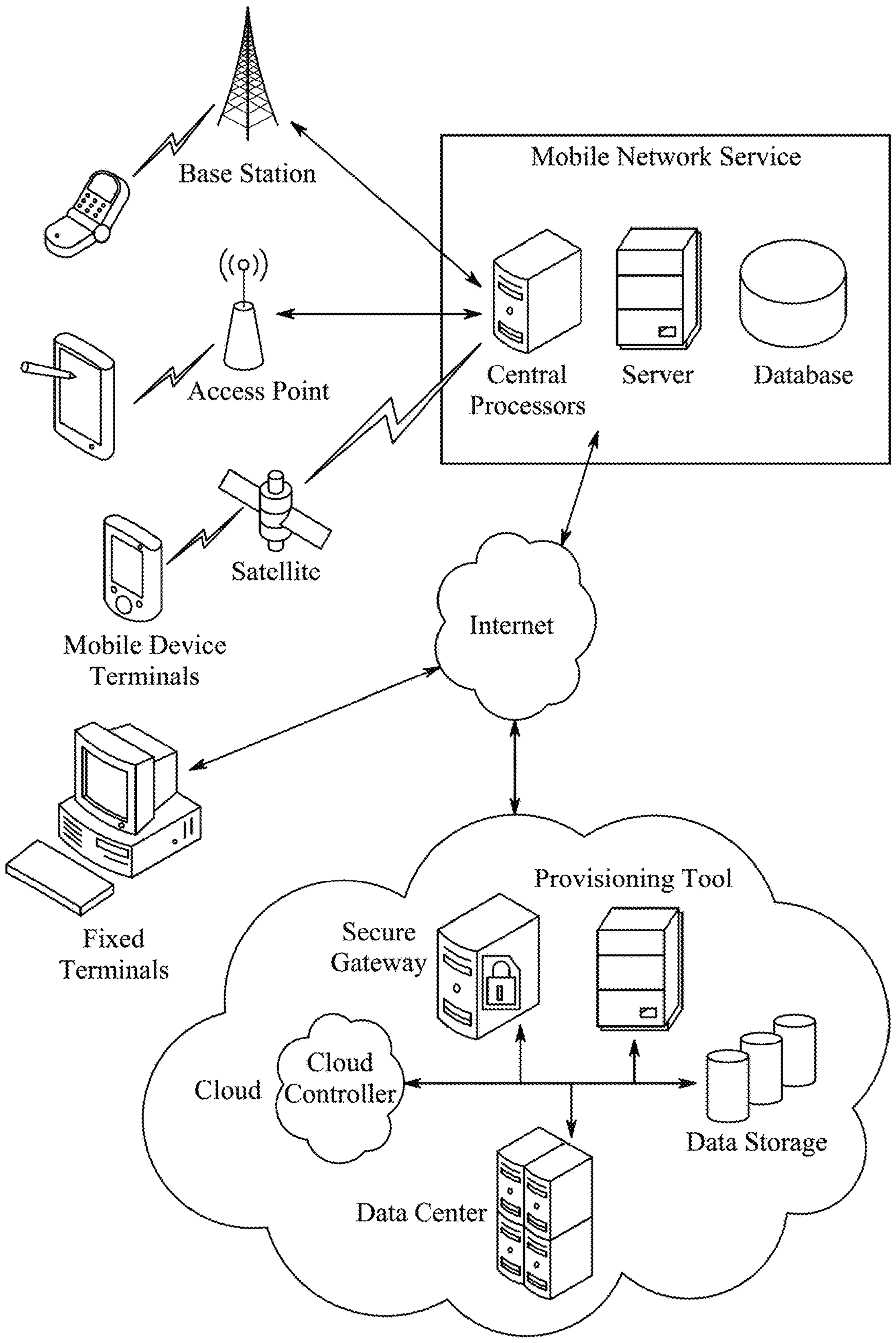
FIG. 18 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing as shown in FIG. 18, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A millimeter wave device for connecting a rectangular waveguide (RWG) and a substrate integrated waveguide (SIW), comprising:

a first rectangular waveguide (RWG) and a second RWG;

a substrate integrated waveguide (SIW) having a plurality of metallic vias;

a first hollow metallic structure having a rectangular first end configured to connect to an exit aperture of the first RWG and a rectangular second end configured to connect with an entrance aperture of the SIW, wherein the first hollow metallic structure comprises a tapered body which extends from the rectangular first end to the rectangular second end; and a second hollow metallic structure having a rectangular first end configured to connect with an entrance aperture of the second RWG and a rectangular second end configured to connect to an exit aperture of the SIW, wherein the second hollow metallic structure comprises a tapered body which extends from the rectangular first end to the rectangular second end, wherein the tapered body of the first hollow metallic structure has a transition length between its rectangular first end and its rectangular second end of about 1 mm to about 15 mm for an SIW aperture height in the range of about 0.2 mm to about 1.0 mm, has an impedance in a range of about 350 ohms to about 400 ohms at its rectangular first end, at which an impedance of first hollow metallic structure matches an impedance of the exit aperture of the first RWG, and has an impedance at its rectangular second end which matches an impedance of the entrance aperture of the SIW, wherein the tapered body of the second hollow metallic structure has a transition length between its rectangular first end and its rectangular second end of about 1 mm to about 15 mm for an SIW aperture height in the range of about 0.2 mm to about 1.0 mm, has an impedance in a range of about 350 ohms to about 400 ohms at its rectangular first end, at which an impedance of the second hollow metallic structure matches an impedance of the entrance aperture of the second RWG, and has an impedance at its rectangular second end which matches an impedance of the exit aperture of the SIW, wherein each hollow metallic structure has a voltage standing wave ratio in the range of about 1 to about 5 for transition lengths of about 3 mm to about 20 mm and for SIW substrate heights of about 0.127 mm to about 0.787 mm, has a total reflection coefficient in the range of about −20 dB to about −10 dB and has modal purity in a range of about −1 dB to about 0.25 dB in a dominant mode and about −125 dB to about −75 dB in a non-dominant mode during a transmission a millimeter wave having a frequency λ in the range of about 50 GHz to about 75 GHz through the transition apparatus.

2. The millimeter wave device of claim 1, wherein:

the rectangular first end of the first hollow metallic structure has a width $a_0$ and a height $b_0$;

the rectangular second end of the first hollow metallic structure has a width $a_1$ and a height $b_1$; and the tapered body of the first hollow metallic structure is designed to taper out when either $a_0<a_1$ or $b_0<b_1$.

3. The millimeter wave device of claim 1, wherein:

the rectangular first end of the first hollow metallic structure has a width $a_0$ and a height $b_0$;

the rectangular second end of the first hollow metallic structure has a width $a_1$ and a height $b_1$; and the tapered body of the first hollow metallic structure is designed to taper in when either $a_0>a_1$ or $b_0>b_1$.

4. The millimeter wave device of claim 1, wherein:

the rectangular first end of the second hollow metallic structure has a width $a_1$ and a height $b_1$;

the rectangular second end of the second hollow metallic structure has a width $a_0$ and a height $b_0$; and the tapered body of the second hollow metallic structure is designed to taper in when either $a_0<a_1$ or $b_0<b_1$.

5. The millimeter wave device of claim 1, wherein:

the rectangular first end of the second hollow metallic structure has a width $a_1$ and a height $b_1$;

the rectangular second end of the second hollow metallic structure has a width $a_0$ and a height $b_0$; and the tapered body of the second hollow metallic structure is designed to taper out when either $a_0>a_1$ or $b_0>b_1$.

6. The millimeter wave device of claim 1, wherein:

the SIW aperture includes a dielectric bridge which extends into the rectangular second end of the first hollow metallic structure;

the rectangular first end of the first hollow metallic structure has a width $a_0$ and a height $b_0$;

the rectangular second end of the first hollow metallic structure has a width $a_1$ and a height $b_1$; wherein:

the tapered body of the first hollow metallic structure is designed to taper out when either $a_0<a_1$ or $b_0<b_1$, and the tapered body of the first hollow metallic structure is designed to taper in when either $a_0>a_1$ or $b_0>b_1$.

7. The millimeter wave device of claim 6, wherein:

a length $L_{SIW}$ of the tapered body of the first hollow metallic structure between the rectangular first end and the rectangular second end is given by:

$$L_{AFSIW} \cong 0.35\sqrt{K_0^2\lambda^2 + K_1^2\lambda^2}\text{, where}$$

$$K_0 = \frac{\frac{(b_1 - b_0)}{b_0} - \frac{a_1 - a_0}{a_0}\left(\frac{\epsilon_{eff}}{\epsilon_{eff} - \left(\frac{\lambda_0}{2a_0}\right)^2}\right)}{\left(\epsilon_{eff} - \left(\frac{\lambda_0}{2a_0}\right)^2\right)^{\frac{1}{2}}}\text{; and}$$

$$K_1 = \frac{\frac{(b_1 - b_0)}{b_1} - \frac{a_1 - a_0}{a_1}\left(\frac{\epsilon_{eff}}{\epsilon_{eff} - \left(\frac{\lambda_0}{2a_1}\right)^2}\right)}{\left(\epsilon_{eff} - \left(\frac{\lambda_0}{2a_1}\right)^2\right)^{\frac{1}{2}}}$$

where λ is a frequency of the millimeter wave transmitted through the transition apparatus, $\lambda_0$ is a resonant frequency of the first RWG and $\varepsilon_{eff}$ is an effective dielectric constant of the SIW.

8. The millimeter wave device of claim 7, wherein:

the total reflection coefficient $\Gamma_T$ of the first hollow metallic structure when connected between the first RWG and the SIW is given by:

$$\Gamma_T = \frac{1}{4\gamma_0}\left(\frac{d}{dx}\ln Z_0\right) - \frac{1}{4\gamma_2}\left(\frac{d}{dx}\ln Z_2\right)\exp\left(-2\int_0^{L_1}\gamma_T dx\right) + \Gamma_A$$

where $\gamma_0$ is a propagation constant of the first RWG, $\gamma_1$ is a propagation constant of the SIW, $\gamma_T$ is a propagation constant of the first hollow metallic structure, $Z_0$ is an impedance of the first RWG, $Z_2$ is an impedance of the SIW and $\Gamma_A$ is added to account for reflections from within the SIW.

9. The millimeter wave device of claim 6, wherein:

a length $L_{SIW}$ of the tapered body of the second hollow metallic structure between the rectangular first end and the rectangular second end is given by:

$$L_{AFSIW} \cong 0.35\sqrt{K_0^2\lambda^2 + K_1^2\lambda^2}, \text{ where}$$

$$K_0 = \frac{\frac{(b_1-b_0)}{b_0} - \frac{a_1-a_0}{a_0}\left(\frac{\epsilon_{eff}}{\epsilon_{eff}-\left(\frac{\lambda_0}{2a_0}\right)^2}\right)}{\left(\epsilon_{eff}-\left(\frac{\lambda_0}{2a_0}\right)^2\right)^{\frac{1}{2}}}; \text{ and}$$

$$K_1 = \frac{\frac{(b_1-b_0)}{b_1} - \frac{a_1-a_0}{a_1}\left(\frac{\epsilon_{eff}}{\epsilon_{eff}-\left(\frac{\lambda_0}{2a_1}\right)^2}\right)}{\left(\epsilon_{eff}-\left(\frac{\lambda_0}{2a_1}\right)^2\right)^{\frac{1}{2}}},$$

where $\lambda$ is a frequency of the millimeter wave transmitted through the transition apparatus, $\lambda_0$ is a resonant frequency of the second RWG and $\varepsilon_{eff}$ is an effective dielectric constant of the SIW.

10. The millimeter wave device of claim 1, wherein:

the SIW is an air-filled SIW (AFSIW);

the rectangular first end of the second hollow metallic structure has a width $a_1$ and a height $b_1$;

the rectangular second end of the second hollow metallic structure has a width $a_0$ and a height $b_0$; wherein:

the tapered body of the second hollow metallic structure is designed to taper out when either $a_1<a_0$ or $b_1<b_0$, and the tapered body of the second hollow metallic structure is designed to taper in when either $a_0>a_1$ or $b_0>b_1$.

11. The millimeter wave device of claim 10, wherein:

a length $L_{AFSIW}$ of the tapered body of the second hollow metallic structure between the first end and the second end is given by:

$$L_{AFSIW} \cong 0.35\sqrt{K_0^2\lambda^2 + K_1^2\lambda^2}, \text{ where}$$

$$K_0 = \frac{\frac{(b_1-b_0)}{b_0} - \frac{a_1-a_0}{a_0}\left(\frac{\epsilon_{eff}}{\epsilon_{eff}-\left(\frac{\lambda_0}{2a_0}\right)^2}\right)}{\left(\epsilon_{eff}-\left(\frac{\lambda_0}{2a_0}\right)^2\right)^{\frac{1}{2}}}; \text{ and}$$

-continued $$K_1 = \frac{\frac{(b_1-b_0)}{b_1} - \frac{a_1-a_0}{a_1}\left(\frac{\epsilon_{eff}}{\epsilon_{eff}-\left(\frac{\lambda_0}{2a_1}\right)^2}\right)}{\left(\epsilon_{eff}-\left(\frac{\lambda_0}{2a_1}\right)^2\right)^{\frac{1}{2}}};$$

where $\lambda$ is a frequency of the millimeter wave transmitted through the transition apparatus, $\lambda_0$ is a resonant frequency of the second RWG and $\varepsilon_{eff}$ is an effective dielectric constant of the AFSIW.

12. The millimeter wave device of claim 11, wherein:

the total reflection coefficient $\Gamma_T$ of the second hollow metallic structure when connected between the AFSIW and the second RWG is given by:

$$|\Gamma_{AFSIW}| = \frac{1}{\frac{L_1}{\lambda_0}}\sqrt{\left(\frac{K_0^2+K_1^2}{64\pi^2}\right) - \left(\frac{K_0K_1}{32\pi^2}\right)\cos(4\pi l)} + \Gamma_A$$

where $$\Gamma_A = \frac{a_1\sqrt{4-\frac{\lambda_0^2}{a_1^2}}\left(W^3\sqrt{\varepsilon_r}+2w_1^3\right) - 2\left(W^2+2w_1^2\right)^2\sqrt{\varepsilon_r}\sqrt{1-\frac{0.0625\lambda_0^2}{(W-1.25w_1)^2}}}{2\left(W^2+2w_1^2\right)^2\sqrt{\varepsilon_r}\sqrt{1-\frac{0.0625\lambda_0^2}{(W-1.25w_1)^2}} + a_1\sqrt{4-\frac{\lambda_0^2}{a_1^2}}\left(W^3\sqrt{\varepsilon_r}+2w_1^3\right)};$$

and $$l = \frac{L_1}{\lambda_0}\left\{1-\frac{1}{8}\left(\frac{\lambda_0}{a_1-a_0}\right)\left[\left(\frac{\lambda_0}{a_0}\right)-\left(\frac{\lambda_0}{a_1}\right)\right]\right\}$$

where $L_1=L_{AFSIW}$, $\gamma_0$ is a propagation constant of the second RWG, $\gamma_1$ is a propagation constant of the AFSIW, $\gamma_T$ is a propagation constant of the first hollow metallic structure, $Z_0$ is an impedance of the second RWG, W is a width of an air-filled region of the AFSIW, $w_1$ is a width of a dielectric filled region of the AFSIW, and $\varepsilon_r$ is a dielectric constant of the second hollow metallic structure.

13. The millimeter wave device of claim 11, wherein the first hollow metallic structure and the second hollow metallic structure are made of aluminum.

* * * * *